(12) United States Patent
Saroiu et al.

(10) Patent No.: US 12,015,646 B2
(45) Date of Patent: Jun. 18, 2024

(54) SECURITY FOR 5G NETWORK SLICING

(71) Applicant: Microsoft Technology Licensing, LLC, Redmond, WA (US)

(72) Inventors: Stefan Saroiu, Redmond, WA (US); Paramvir Bahl, Bellevue, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 408 days.

(21) Appl. No.: 17/355,056

(22) Filed: Jun. 22, 2021

(65) Prior Publication Data

US 2022/0407890 A1 Dec. 22, 2022

(51) Int. Cl.
*H04L 9/40* (2022.01)
*H04W 12/03* (2021.01)
*H04W 12/06* (2021.01)

(52) U.S. Cl.
CPC ............ *H04L 63/20* (2013.01); *H04W 12/03* (2021.01); *H04W 12/06* (2013.01)

(58) Field of Classification Search
CPC .... H04L 63/20; H04L 63/0428; H04W 12/03; H04W 12/06; G06F 21/53
USPC ....................................................... 455/434
See application file for complete search history.

(56) References Cited

U.S. PATENT DOCUMENTS

| 10,992,396 B1 | 4/2021 | Nahata et al. |
| 2016/0353422 A1 | 12/2016 | Vrzic et al. |
| 2018/0288095 A1 | 10/2018 | Shaw et al. |
| 2019/0037020 A1 | 1/2019 | Dowlatkhah et al. |
| 2021/0117247 A1* | 4/2021 | Panneer ................ H04L 9/0897 |
| 2021/0157903 A1 | 5/2021 | Bursell et al. |

(Continued)

FOREIGN PATENT DOCUMENTS

| CN | 112866998 A * | 5/2021 | ......... H04L 41/0893 |
| CN | 112866998 A | 5/2021 | |

OTHER PUBLICATIONS

Vipin N Sathi, Manikantan Srinivasan, Prabhu K Thiruvasagam, Siva Ram Murthy Chebiyyam, A Novel Protocol for Securing Network Slice Component Association and Slice Isolation in 5G Networks (Year: 2018).*

(Continued)

*Primary Examiner* — Tanmay K Shah
(74) *Attorney, Agent, or Firm* — Mark K. Young; Mark Young PC

(57) ABSTRACT

Slices of a 5G network may be configured to implement a trust model by which network customers are provided with assurances that slice properties meet agreed-upon criteria specified by customer policy so that slices can be trusted. Illustrative slice properties may pertain to service types, geographic area of operations, and attributes associated with software, firmware, and hardware used in the infrastructure of nodes in a trusted slice. Particular values of the properties describe a slice configuration that may be measured, digested, and attested to the customer to provide assurances that the configuration conforms with the policy. The 5G slice trust model may be implemented as a two-way model in which a slice provider performs checks to verify slice properties while customers ensure that only authenticated and authorized user equipment (UE) will access a trusted slice.

19 Claims, 26 Drawing Sheets

(56) References Cited

U.S. PATENT DOCUMENTS

| | | | |
|---|---|---|---|
| 2021/0192056 A1 | 6/2021 | Chang et al. |
| 2021/0258866 A1 | 8/2021 | Chou |
| 2022/0217540 A1 | 7/2022 | Choyi et al. |
| 2022/0408262 A1 | 12/2022 | Saroiu et al. |

OTHER PUBLICATIONS

"Notice of Allowance Issued in U.S. Appl. No. 17/355,033", dated Mar. 15, 2023, 5 Pages.

Kotulski, et al., "5G networks: A Types of isolation and their parameters in RAN and CN slices", In the International Journal of Computer and Telecommunications Networking, vol. 171, Issue C, Feb. 7, 2020, 15 Pages.

Ksentini, et al., "Toward Enforcing Network Slicing on RAN: Flexibility and Resources Abstraction", In Proceedings of IEEE Communications Magazine, vol. 55, Issue 6, Jun. 13, 2017, pp. 102-108.

Ortiz, et al., "INSPIRE-5Gplus intelligent security and pervasive trust for 5G and beyond networks", In Proceedings of the 15th International Conference on Availability, Reliability and Security, Aug. 25, 2020, 10 Pages.

"International Search Report and Written Opinion Issued in PCT Application No. PCT/US22/029091", dated Aug. 3, 2022, 12 Pages.

"International Search Report and Written Opinion Issued in PCT Application No. PCT/US22/029937", dated Aug. 12, 2022, 11 Pages.

Sathi, et al., "A Novel Protocol for Securing Network Slice Component Association and Slice Isolation in 5G Networks", In Proceedings of the 21st ACM International Conference on Modeling, Analysis and Simulation of Wireless and Mobile Systems, Oct. 25, 2018, pp. 249-253.

"Non Final Office Action Issued in U.S. Appl. No. 17/355,033", dated Dec. 5, 2022, 12 Pages.

\* cited by examiner

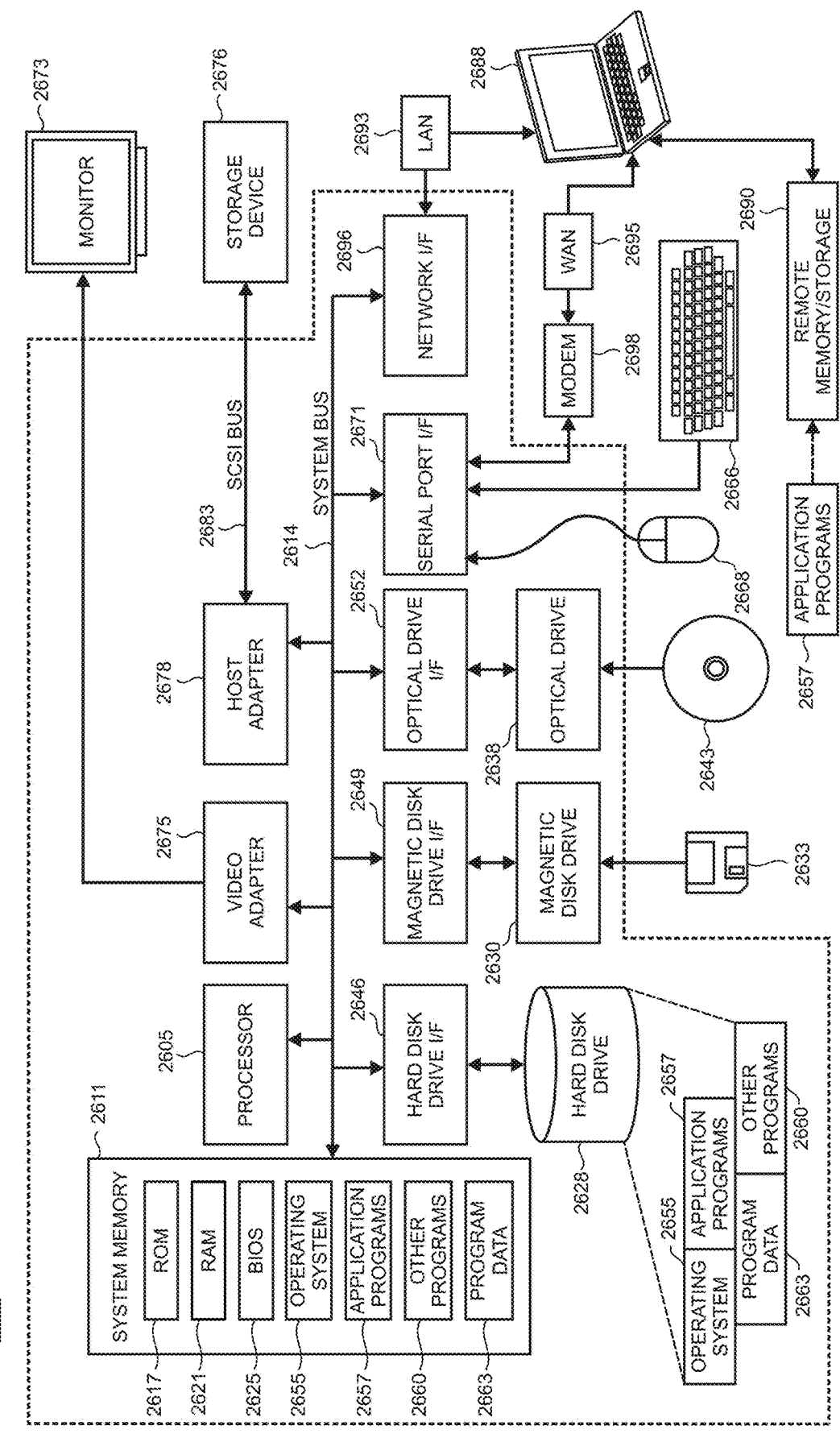

SECURITY FOR 5G NETWORK SLICING

BACKGROUND

Fifth generation (5G) mobile networks offer the ability to connect tens of billions of intelligent devices, densely deployed and generating orders of magnitude more data to be handled by the network. Consumers' expectations for 5G mobile networks are high and mobile network operators will be under real pressure from enterprise customers to move quickly, delivering 5G's low latency, dense device, and high-performance capabilities to enable near-real-time management and control of critical business operations.

SUMMARY

Slices of a 5G network may be configured to implement a trust model by which network customers are provided with assurances that slice properties meet agreed-upon criteria specified by customer policy so that slices can be trusted. Illustrative slice properties may pertain to service types, geographic area of operations, and attributes associated with software, firmware, and hardware used in the infrastructure of nodes in a trusted slice. Particular values of the properties describe a slice configuration that may be measured, digested, and attested to the customer to provide assurances that the configuration conforms with the policy. The 5G slice trust model may be implemented as a two-way model in which a slice provider performs checks to verify slice properties while customers ensure that only authenticated and authorized user equipment (UE) will access a trusted slice.

Trusted slices may be implemented using trusted computing hardware that is distributed among various nodes of the physical infrastructure of a 5G network comprising, for example, the radio access network (RAN), mobile core, or cloud networks. The trusted hardware can include trusted servers and/or trusted enclaves that are configured to execute code in a trusted execution environment (TEE). UE data transmissions may be bound to the trusted hardware in a slice using security primitives including cryptographic sealing and unsealing.

Sealing may be invoked in both the customer UE and the trusted slice which takes the UE data as an input along with the applicable customer policy and outputs encrypted data. Unsealing may occur at the nodes of the trusted slice that need to decrypt the data. Unsealing takes the sealed data as an input and decrypts it only if the slice configuration at the node satisfies the customer policy specified upon seal. Thus, sealed data can only be decrypted and forwarded to a destination by the trusted hardware in the slice to which it is bound. In the event the configuration of the trusted slice changes, for example, non-trusted hardware is utilized in the slice, then decryption and forwarding are not possible. Credentials that are needed to reseal the data that is sent back to the trusted slice are provided to trusted components at a destination. Data traffic in both directions therefore remains bound to the slice in accordance with the trust model.

In various illustrative examples, slice control elements in a 5G slicing framework are instantiated in trusted hardware to provide for sealed data transmission in a given trusted slice. In addition to sealing the data plane in the trusted slice, the control plane for the slice may be secured by the instantiation into the trusted hardware of layer 2 (medium access control—MAC) scheduling functions for radio resources (e.g., subcarriers and time slots). Layer 1 (physical—PHY) may also be configured to further enhance security of the trusted slice by isolating its PHY layer from that of other trusted and non-trusted slices. Such isolation may be implemented, for example, by using dedicated PHY resources, or by limiting resource time sharing to provide temporal isolation. For 5G infrastructure located in edge, far-edge, and/or premise-based datacenters where physical security measures and personnel may be more limited, watchdog timers provided by authenticated sources in trusted hardware may provide monitoring and control functionalities to assure that a slice remains trusted and/or becomes disabled in the event that it has become compromised.

Advantageously, the present trusted 5G slices enable a slice/service provider to offer differentiated services that let customers tailor the level of service and/or security to meet their particular needs. For example, a customer may select a trusted slice to carry mission-critical application data while maintaining visibility of the slice configuration to verify data integrity knowing that no untrusted code is operating on the slice. For other applications, the customer may utilize a standard/non-trusted slice implemented in conventional rich execution environments (REE) for which slice configuration assurances are not required which may be more cost-effective in some cases. In addition, by providing a hardware-based trust model that is effectively deployed across distributed and diverse physical infrastructure of a 5G network in both data and control planes, improvements in slice security and application and data integrity are realized.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. Furthermore, the claimed subject matter is not limited to implementations that solve any or all disadvantages noted in any part of this disclosure. It will be appreciated that the above-described subject matter may be implemented as a computer-controlled apparatus, a computer process, a computing system, or as an article of manufacture such as one or more computer-readable storage media. These and various other features will be apparent from a reading of the following Detailed Description and a review of the associated drawings.

DESCRIPTION OF THE DRAWINGS

FIG. 26 is a simplified block diagram of an illustrative computer system that may be used at least in part to implement the present trusted 5G network slices.

Like reference numerals indicate like elements in the drawings. Elements are not drawn to scale unless otherwise indicated.

Figure 1:
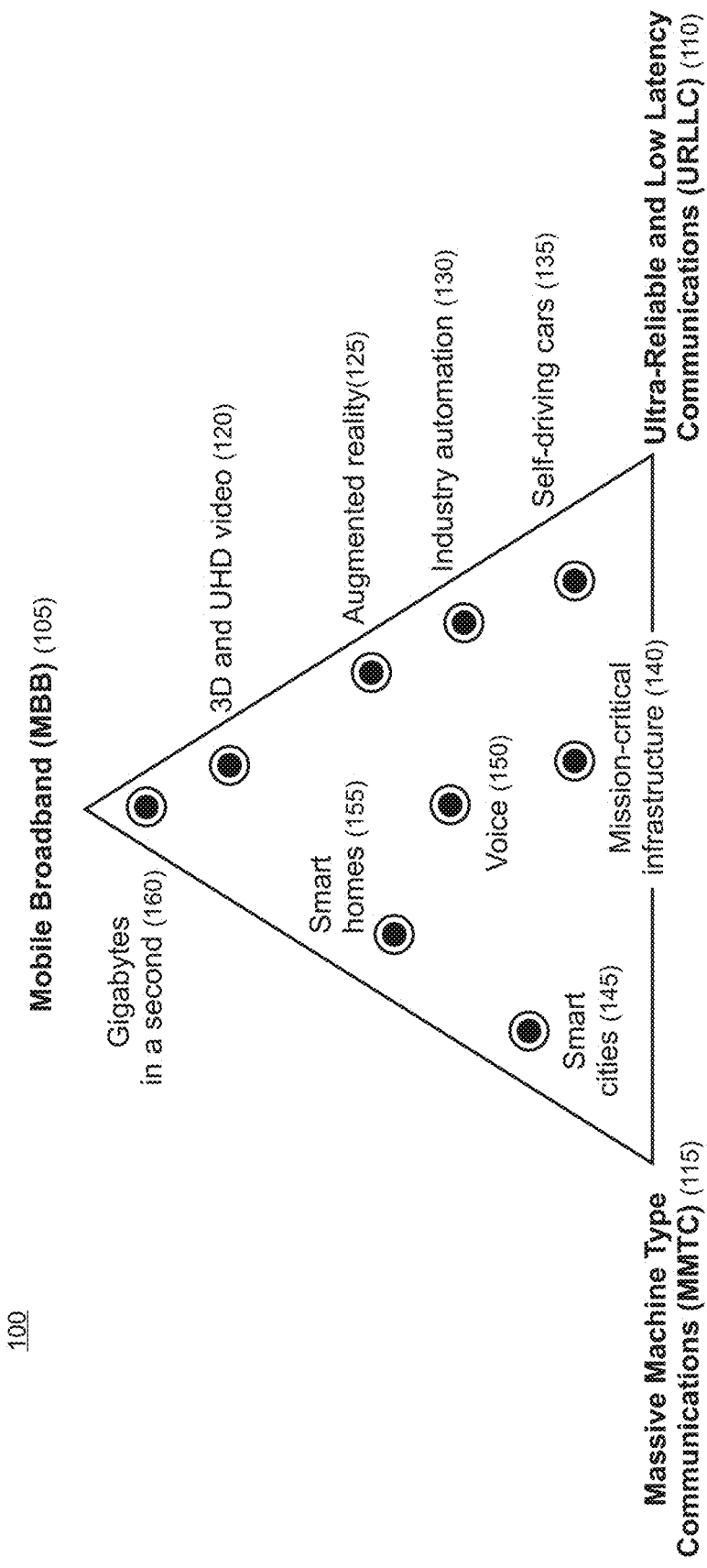
FIG. 1 shows illustrative 5G network usage scenario examples.

DETAILED DESCRIPTION 5G mobile networks utilize a service-based architecture that supports data connectivity and services enabling deployments using techniques such as, for example, Network Function Virtualization (NFV), Software Defined Networking (SDN), and cloud computing. Some exemplary features and concepts of 5G networking include separating User Plane (UP) functions from Control Plane (CP) functions allowing independent scalability, evolution, and flexible deployment across, for example, centralized locations and/or distributed (i.e., remote) locations. The functional design of 5G networks is modularized to enable flexible and efficient network slicing. Dependencies are also minimized between the Radio Access Network (RAN) and the Core Network (CN). The 5G architecture is thus defined with a converged core network with a common AN-CN interface which integrates different Access Types, for example 3GPP (3rd Generation Partnership Project) access and untrusted non-3GPP access such as WiMAX, cdma2000®, WLAN, or fixed networks.

The International Mobile Telecommunications (IMT) recommendation for 2020 from the International Telecommunication Union Radiocommunication Sector (ITU-R M.2083-0) envisions usage scenarios for 5G networks that include: Mobile Broadband (MBB), as indicated by reference numeral 105; Ultra-Reliable and Low Latency Communications (URLLC) 110; and Massive Machine Type Communications (MMTC) 115, as shown in the usage scenario footprint 100 in FIG. 1.

The MBB usage scenario 105 addresses the human-centric use cases for access to multi-media content, services, and data. The demand for mobile broadband will continue to increase, leading to enhanced Mobile Broadband. The enhanced MBB usage scenario will come with new application areas and requirements in addition to existing MBB applications for improved performance and an increasingly seamless user experience. The enhanced MBB usage scenario may cover a range of cases, including wide-area coverage and hotspot, which have different requirements.

For the hotspot case (i.e., for an area with high user density), very high traffic capacity is needed, while the requirement for mobility is typically low and user data rate is higher than that of wide-area coverage. For the wide-area coverage case, seamless coverage and medium to high mobility are desired, with much improved user data rate—20 Gbps for download and 10 Gbps for upload—compared to existing data rates. However, the data rate requirement may be relaxed compared to hotspot.

The URLLC usage scenario 110 may typically have relatively stringent requirements for capabilities such as latency and availability. For example, latency in the RAN may be expected to be less than 1 ms with high reliability. Some examples include wireless control of industrial manufacturing or production processes, remote medical surgery, distribution automation in a smart grid, transportation safety, etc.

The MMTC usage scenario may be characterized by a very large number of connected devices such as Internet of Things (IoT) devices with hundreds of thousands of connected devices per square kilometer. MMTC may also be referred to as "Massive IoT" (MIoT) in some 5G literature. Such connected devices can be expected to transmit a relatively low volume of non-delay-sensitive data. Devices are typically required to be low cost and have a very long battery life.

Illustrative applications for 5G networking are also shown in FIG. 1. The applications can fall within the usage scenario examples 100 at different locations depending on a given balance of application networking requirements. As shown, the illustrative applications can include three-dimensional and/or ultra-high-definition (3D and UHD) 120; augmented reality 125; industry automation 130; self-driving cars 135; mission-critical infrastructure 140; smart cities 145; voice 150; smart homes 155; and gigabytes in a second 160.

It is emphasized that the ITU expects additional 5G usage scenarios and applications to emerge, and 5G network operators may not necessarily be limited to or required to support any particular usage scenarios or pre-defined slice types. Similarly, application and service providers may be expected to leverage the higher speeds and lower latency of 5G to develop feature-rich capabilities for all kinds of connected devices (both fixed and mobile), deliver compelling user experiences across a range of computing devices and platforms, and further realize the potential of artificial intelligence (AI) and IoT in a way that current connectivity prohibits.

With 5G, mobile networks can be optimized as features such as network slicing become available for both operators and enterprises deploying 5G infrastructure. A network slice is a logical (i.e., virtual) network customized to serve a defined purpose, type/class of service, quality of services (QoS), or dedicated customers. A 5G network slice may be dynamically created consisting of an end-to-end composition of all the varied network resources and infrastructure needed to satisfy the specific performance and requirements of a particular service class or application that may meet some pre-defined service level agreement (SLA). Each portion of the 5G network is respectively sliced such that the network can be viewed as being composed of RAN slices, mobile core slices, cloud slices, etc. 5G network slicing thus enables creation of multiple logical and secure networks that are isolated from each other, but which span over the same common physical network infrastructure.

5G network slices may consist of resources composed into an end-to-end service delivery construct. These may include physical resources, either a share or profile allocated to a slice, or dedicated physical resources in some cases. Slices also consist of logical entities such as configured network functions, management functions, VPNs (virtual private networks), etc. Resources (physical or logical) can be dedicated to a 5G network slice, i.e., separate instances, or they may be shared across multiple slices. These resources are not necessarily all produced within the mobile network provider as some may comprise services consumed from other providers, facilitating, for example, aggregation, cloud infrastructure, roaming, etc.

Figure 2:
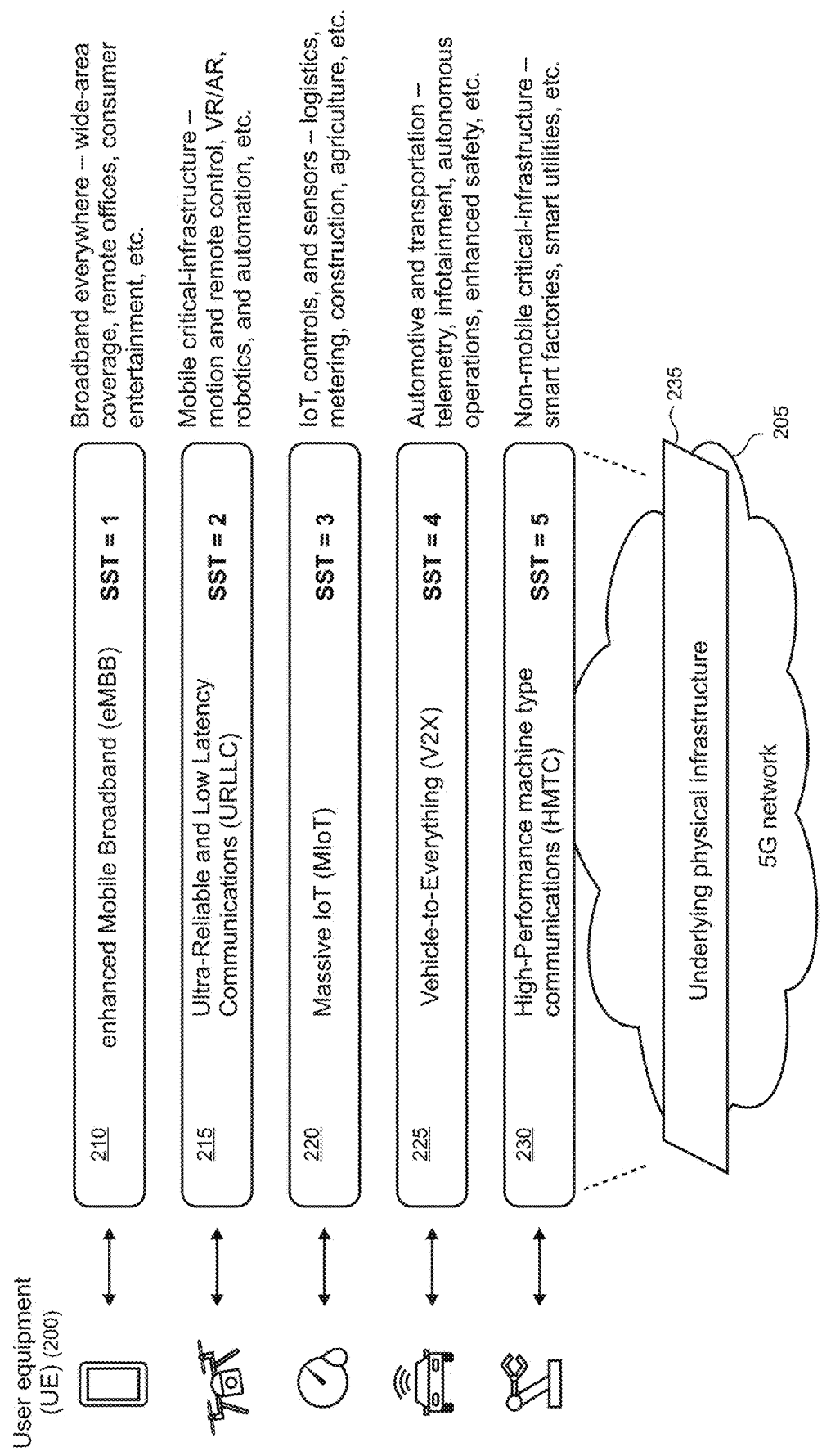
FIG. 2 shows illustrative standardized 5G network slices.

3GPP is the principal standards organization engaged in the architecture development for 5G. Several iterations of standards releases have established a foundation for the current phase of slice-specific definition. The 3GPP R15 System Architecture (3GPP TS 23.501) currently defines standard service-based Slice/Service types (SST). As shown in FIG. 2, the standardized 3GPP network slices of a 5G network 205 include eMBB (enhanced Mobile Broadband) (SST=1), URLLC (SST=2), and MIoT (SST=3) which correspond to the usage scenarios described by ITU-R 2083-0. Additional standardized SST values for V2X (Vehicle-to-Everything) (SST=4) and HMTC (High-Performance Machine Type Communications (SST=5) are also defined by 3GPP. It may be appreciated that slice service types beyond those having standardized SST values can be defined.

The five standardized or pre-defined service types for 5G network slices are respectively indicated by reference numerals 210, 215, 220, 225, and 230 in FIG. 2. IMT-2020 describes the concept of network slicing as supporting a wide variety of requirements in UE and application services using a network where multiple logical network instances tailored to the requirements can be created. Network slicing allows the 5G network operator to provide dedicated logical networks (i.e., network slices) with customer specific functionality. The 5G architecture enables different network configurations in different network slices.

A network slice can be dedicated to different types of services and span all the domains of the underlying physical infrastructure 235, such as the transport network supporting flexible locations of functions, dedicated radio configurations or specific radio access technologies (RATs), and the mobile core network. Network slices can also be deployed across multiple operators. Slices can share common physical infrastructure or may have dedicated resources and/or functions in some cases. Different types of network slices can be composed of not only standardized network functions but also some proprietary functions that may be provided by different operators or third parties.

Standardized SST values and pre-defined slice types provide a way for establishing global interoperability for 5G network slicing so that operators can efficiently support key industry verticals—for example, industrial automation, healthcare, entertainment, transportation, manufacturing, energy, agriculture, construction, security, etc.—for the most commonly used pre-defined Slice/Service Types. Additional customization and/or specialization for applications and services may be implemented for specific usage scenarios. A UE may provide Network Slice Selection Assistance Information (NSSAI) parameters to the network to help it select a RAN and a core network part of a slice instance for the device. A single NSSAI may lead to the selection of several slices. NSSAI consists of Session Management NSSAIs (SM-NSSAI), which each include an SST and possibly a Slice Differentiator (SD). SST may refer to an expected network behavior in terms of features, e.g., broadband or IoT, while the SD can help in the selection among several slice instances of the same type. It is noted that services supported in a standardized pre-defined slice may also be supported by other pre-defined slices having other (i.e., non-standard) SST values.

FIG. 2 shows user equipment (UE) 200 that may be representative of the wide variety of device types that may utilize 5G networking including, for example and not by way of limitation, smartphones and computing devices, drones, robots, process automation equipment, sensors, control devices, vehicles, transportation equipment, tactile interaction equipment, virtual and augmented reality (VR and AR) devices, industrial machines, and the like. The standardized slices can be respectively mapped to such UE types in typical usage scenarios to optimize network utilization and user experiences, but 5G network slicing is designed for flexibility to meet demand across a wide spectrum of device types and diverse applications and services. The network softwarization provided by SDN and NFV paradigms in 5G enables network slice configuration—i.e., how various physical infrastructure and network resources are deployed—to be rapidly and dynamically adapted to ensure that performance objectives are continuously met for 5G applications across a given population of UEs.

As shown, the configuration of eMBB slice 210 may be optimized for broadband-everywhere usage scenarios across a wide coverage area for applications such as consumer entertainment (e.g., video, gaming, streaming), remote offices, etc., where maximized network speeds and data rates are desired and high traffic volumes are typically experienced. The URLLC slice 215 may be configured for mobile critical-infrastructure low-latency usage scenarios including applications such as remote control operations in medical and industrial environments, VR and AR, robotics and automation, etc.

The MIoT slice 220 may be configured for optimal handling of IoT, control, and sensor applications relating to logistics, construction, and metering in vertical industries such as construction and agriculture. The V2X slice 225 may be optimized for automotive and transportation applications such as telemetry, infotainment, autonomous operations, enhanced safety, and the like. The HMTC slice 230 is typically configured for optimal handling of non-mobile/fixed critical-infrastructure applications such as smart factories, smart utilities, etc.

Figure 3:
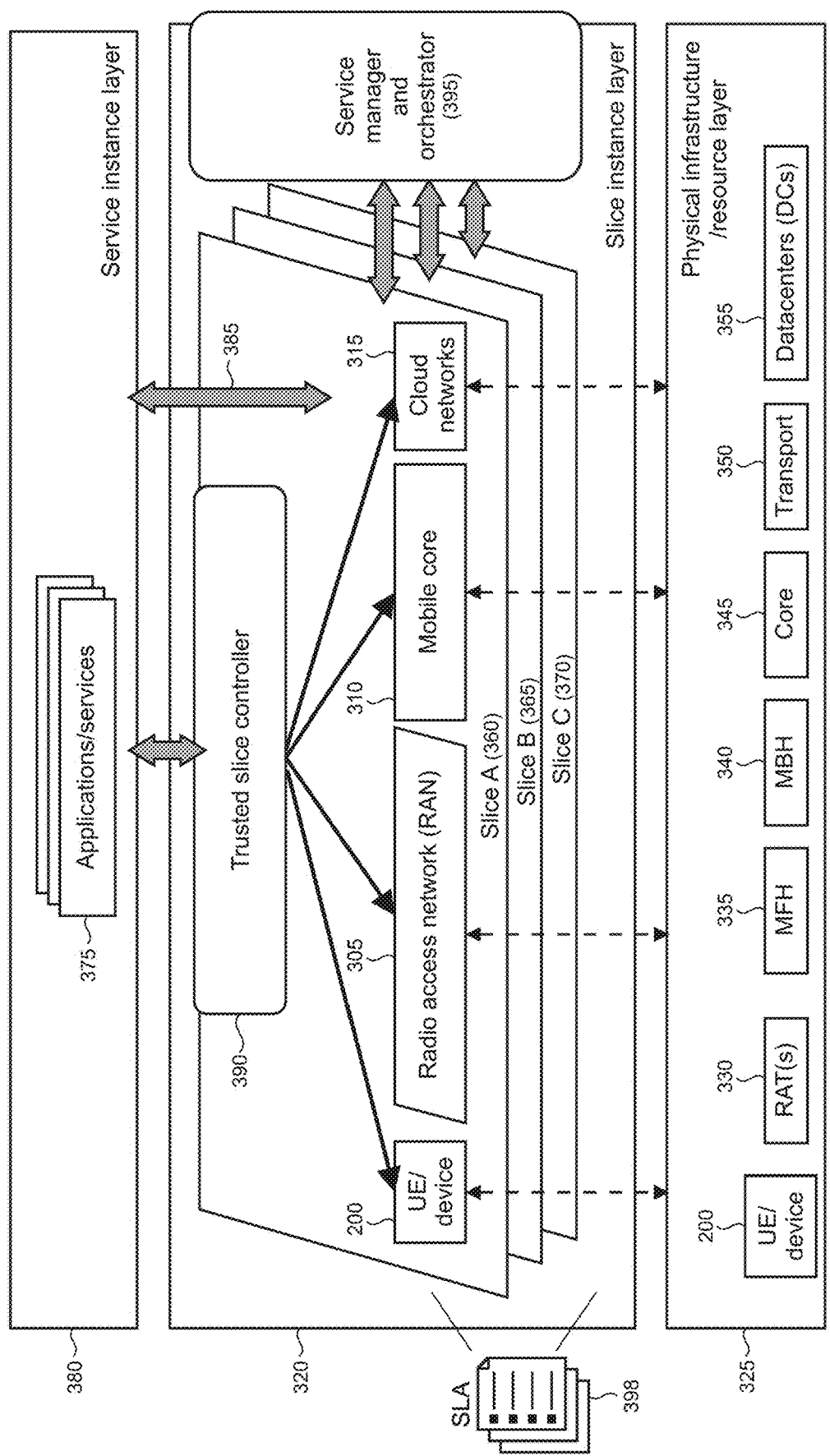
FIG. 3 shows an illustrative layered 5G network slicing framework.

FIG. 3 shows an illustrative layered 5G network slicing framework 300 that is described in the IMT-2020 recommendation. The framework comprises a RAN 305, mobile packet core 310, and cloud networking components 315 that are logically represented in a network slice instance layer 320 that sits above a physical infrastructure layer 325 in the framework. The physical infrastructure layer provides an abstraction of radio, compute, network, and storage resources which may include, for example, one or more RATs 330, mobile fronthaul (MFH) 335, mobile backhaul (MBH) 340, mobile core network 345, transport 350, and one or more datacenters (DCs) 355. In some cases, one or more UE instances may be implemented as resources.

In this illustrative example, the slice instance layer includes three 5G network slices—Slice A 360, Slice B 365, and Slice C 370, but more or fewer slices may be utilized in any given implementation at any given time. These slices may include one or more of the pre-defined slice types shown in FIG. 2 and described in the accompanying text or comprise different slice types.

Slices may be isolated by logically or physically isolating their underlying resources. The slices can support instances of various applications and/or services (collectively indicated by reference numeral 375) in a service instance layer 380, for example, using an application programming interface (API), as representatively indicated by reference numeral 385. Each network slice may be viewed as an independent logical collection of resources which can dynamically vary in configuration from slice to slice as needed to meet pre-defined technical characteristics (e.g., throughput, latency, reliability, etc.) and/or business characteristics as required by an application/service instance.

A slice controller 390 is utilized with the slicing framework 300 to maintain awareness of the application requirements to responsively allocate and manage the virtualized network functions and resources in each slice. The controller may be configured as a trusted slice controller, as described in more detail below in the text accompanying FIG. 12. A service manager and orchestrator 395 combines the necessary resources and functions to produce a network slice instance. Its main tasks include creation of slice instances upon the underlying physical infrastructure, dynamically mapping network functions to slice instances to meet changing context and maintaining communication between the application and services and the framework to manage slice lifecycle.

As shown, a service level agreement (SLA) 398 is typically applicable to each of the slices 360, 365, and 370. The applicable SLAs can vary in scope and composition. The slice controller 390 may be advantageously utilized to perform resource allocation among RAN slices to meet the connectivity requirements while ensuring compliance with applicable SLA guarantees in some cases.

An SLA may be defined as a contract between the provider of a service and its internal or external end-user or customer that defines what services the provider will offer and the level of performance it must meet as well as any remedies or penalties should the agreed-upon levels not be realized. According to the ITU, an "SLA is a formal agreement between two or more entities that is reached after a negotiating activity with the scope to assess service characteristics, responsibilities and priorities of every part." SLAs typically establish customer expectations for a provider's performance and quality. Various types of customers can be supported by the present trusted 5G network slices, typically depending on applicable circumstances and context. For example, customers may include, but are not limited to consumers, businesses, enterprises, organizations, service providers, application developers, and the like. A 5G network operator may support its own services to customers as well as services from multiple different third-party providers. For example, one third-party provider may offer services to customers on one particular network slice while another third-party provider offers services on another network slice. Each discrete service offering may have its own corresponding distinct SLA.

SLA terms may include metrics covering technical aspects of service, for example describing a level and volume of communication services and which measure the performance characteristics of a provided service. Such technical metrics may include but not be limited to, for example, availability, throughput, latency, bit/packet error rate, and energy. SLAs may also include business, economic, and legal terms covering the agreement between the service provider and the customer. SLAs for different service and slice types can vary. For example, some slice types have more elasticity with regard to RAN resource allocation where resources can be readily adjusted depending on resource demand. Other slice types may be more inelastic. For example, the URLLC slice type may require strict resource allocation to guarantee reliability and low latency under a corresponding SLA, while enhanced MBB resources may be readily scaled downward once the edge cloud buffering is complete.

Figure 4:
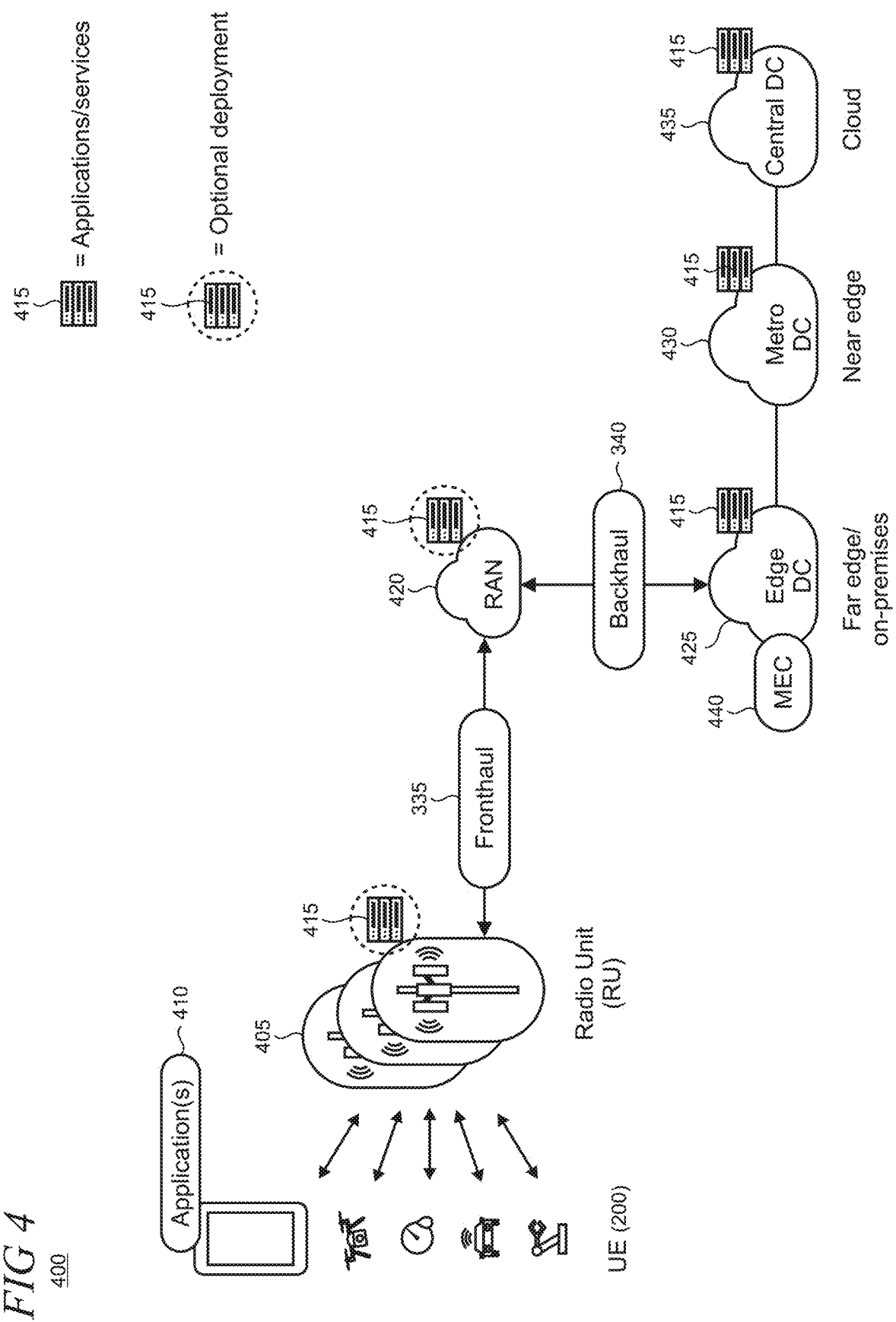
FIG. 4 shows illustrative physical infrastructure in a 5G network architecture.

FIG. 4 shows illustrative physical infrastructure in a 5G network 400. Multiple instances of a radio unit (RU) 405 are configured to interact with a diverse population of UE 200. Each UE typically includes one or more local applications 410 or client-side software/firmware component that is arranged to interface with one or more remote application servers, service providers, or other resources (collectively indicated by reference numeral 415) and thus require network connectivity to such remote facilities.

The RUs are coupled by the mobile fronthaul 335 to a RAN 420. The RAN is coupled by the mobile backhaul 340 to one or more datacenters (DCs). In this illustrative example, the DCs comprise an edge DC 425, a metro DC 430, and a central DC 435. In some networking literature, the edge DC may be referred to as a far edge or on-premises DC. The metro DC may be referred to as a near edge DC, and the central DC may be referred to as the cloud. In some implementations, the edge DC may support multi-access edge computing (MEC) functions 440.

The application servers 415 can be located at various points in the network architecture 400 to meet technical requirements and traffic demands. Typically, the application servers will be physically located closer to the UE 200 in cases where latency is sought to be minimized. However, an operator's application server location criteria may also consider factors such as management ease, scalability, and security, among other factors. In some implementations, an operator may optionally deploy application servers and other resources in the RAN 420 or RU 405, as indicated by the dashed circles in FIG. 4.

Figure 5:
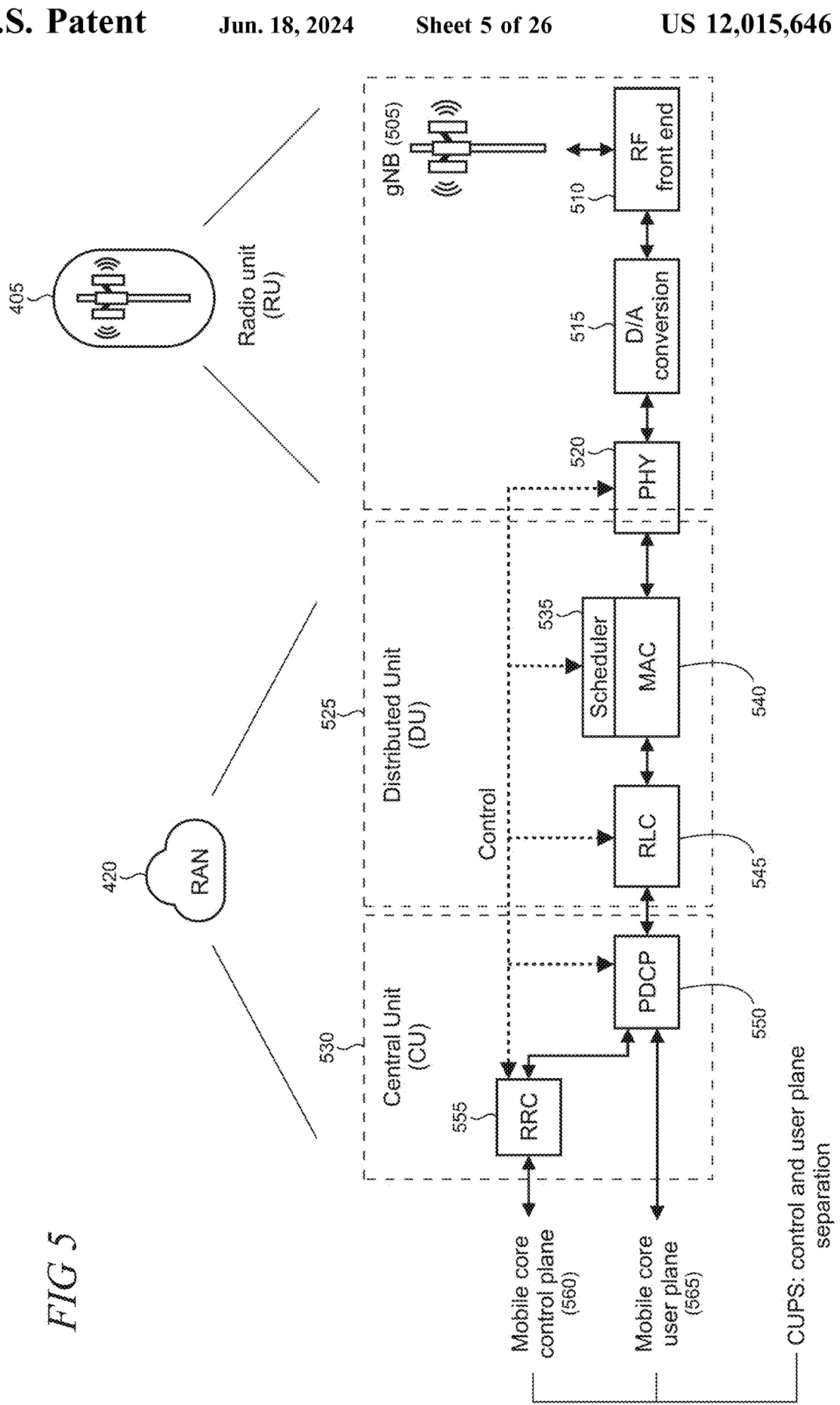
FIG. 5 shows an illustrative 5G radio access network (RAN) and radio unit (RU)

FIG. 5 shows functional blocks of the RAN 420 and RU 405. The RU comprises radio transmission points, for example, a next generation Node B, gNB 505, which handles radio communications with the UE. The gNB is serially coupled to a radio frequency (RF) front end 510, a digital to analog (D/A) conversion unit 515, and a portion of the functionality of the physical (PHY) layer 520 as described in the OSI Open Systems Interconnection model.

Under 3GPP and O-RAN (Open RAN) Alliance, the processing pipeline of the RAN 420 is split into a distributed unit (DU) 525, and a central unit (CU) 530. The DU is responsible for real-time layers 1 and 2 (L1 and L2) scheduling functions, and the CU is responsible for non-real-time, higher L2 and L3 functions. Accordingly, the DU comprises a scheduler 535 located on top of a MAC (Medium Access Control) layer component 540, an RLC (radio link control) layer component 545, and parts of a PHY (physical) layer component 520. The MAC layer component is responsible for buffering, multiplexing, and demultiplexing segments, including all real-time scheduling decisions about which segments are transmitted when. It is also able to make a "late" forwarding decision (i.e., to alternative carrier frequencies, including Wi-Fi, for example). The PHY layer component is responsible for coding and modulation.

The CU 530 is configured with a PDCP (Packet Data Convergence Protocol) layer component 550 and RRC (Radio Resource Control) layer component 555. The PDCP layer component is responsible for compressing and decompressing IP headers, ciphering and integrity protection, and making an "early" forwarding decision (i.e., whether to send the packet down the pipeline to the UE or forward it to another base station). The RRC layer component is responsible for configuring the coarse-grain and policy-related aspects of the RAN processing pipeline. The RRC layer component interfaces with the control plane 560 while the PDCP layer component interfaces with the user plane 565 to thereby implement the "CUPS" feature of 5G (control and user plane separation).

Figure 6:
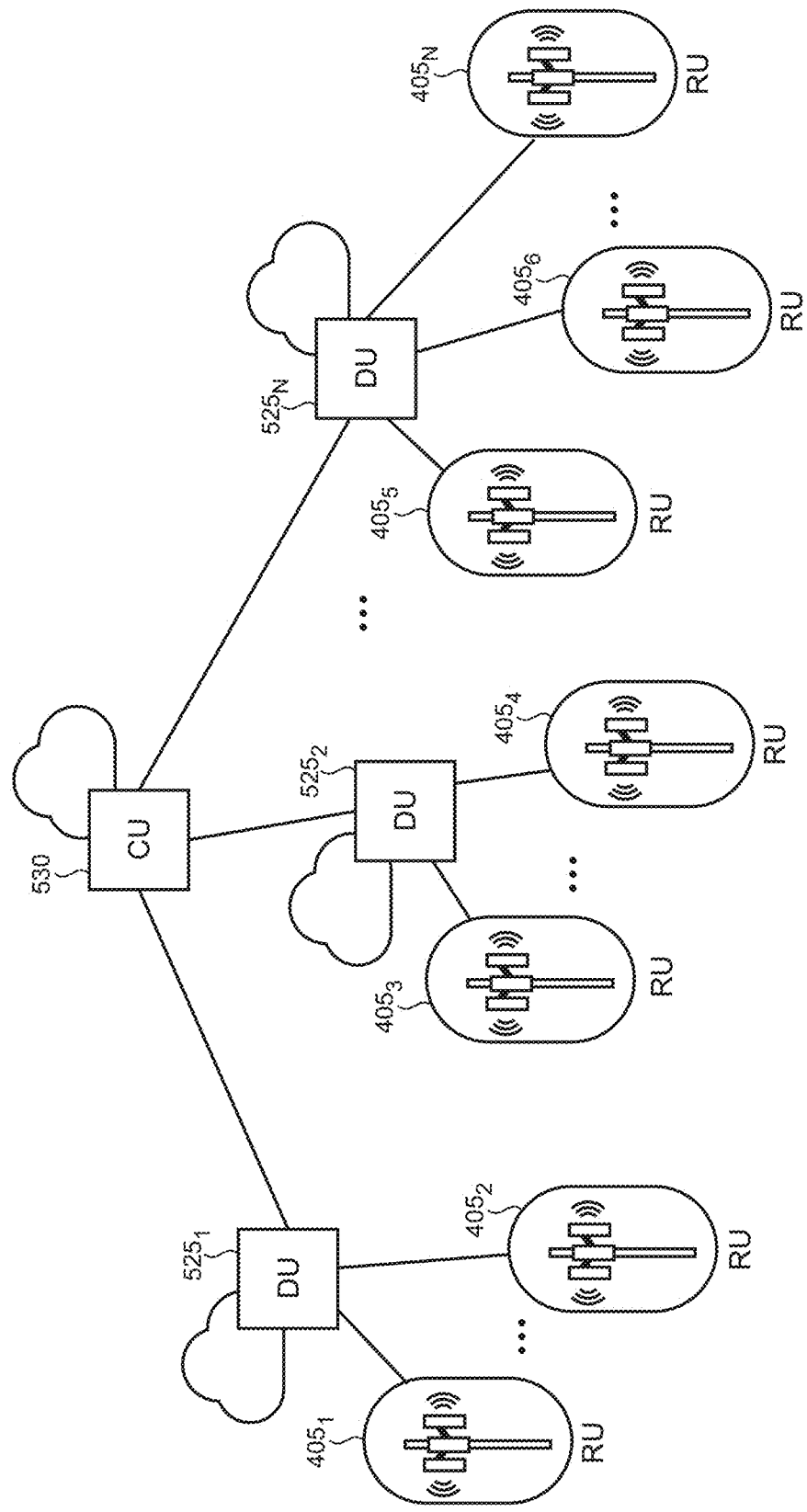
FIG. 6 shows an illustrative split-RAN hierarchy in which a central unit (CU) may support multiple distributed units (DUs) which, in turn, may support multiple RUs.

The split-RAN configuration shown in FIG. 5 enables RAN functionality to be split among physical infrastructure elements in centralized and distributed locations. For example, as shown in FIG. 6, a single CU 530 may be configured to serve multiple DUs 525, each of which in turn serves multiple RUs 405.

Figure 7:
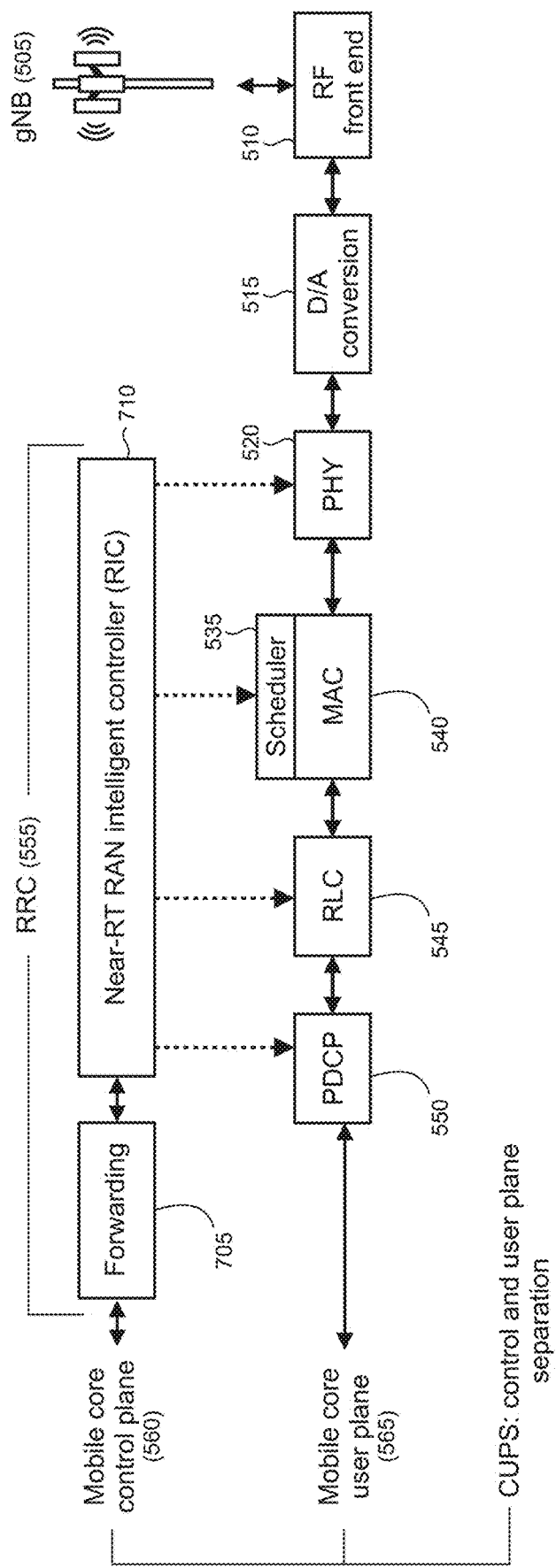
FIG. 7 shows an illustrative radio resource control (RRC) that is disaggregated into a mobile core-facing control plane component and a near-real-time RAN intelligent controller (near-RT RIC)

FIG. 7 shows that the RRC layer component 555 may be disaggregated into a mobile core-facing control plane forwarding component 705 and a near-real-time (RT) controller RAN intelligent controller (RIC) 710. The RRC layer component is thus responsible for only near-real-time configuration and control decision making, while the scheduler 535 on the MAC component 540 is responsible for real-time scheduling decisions.

Figure 8:
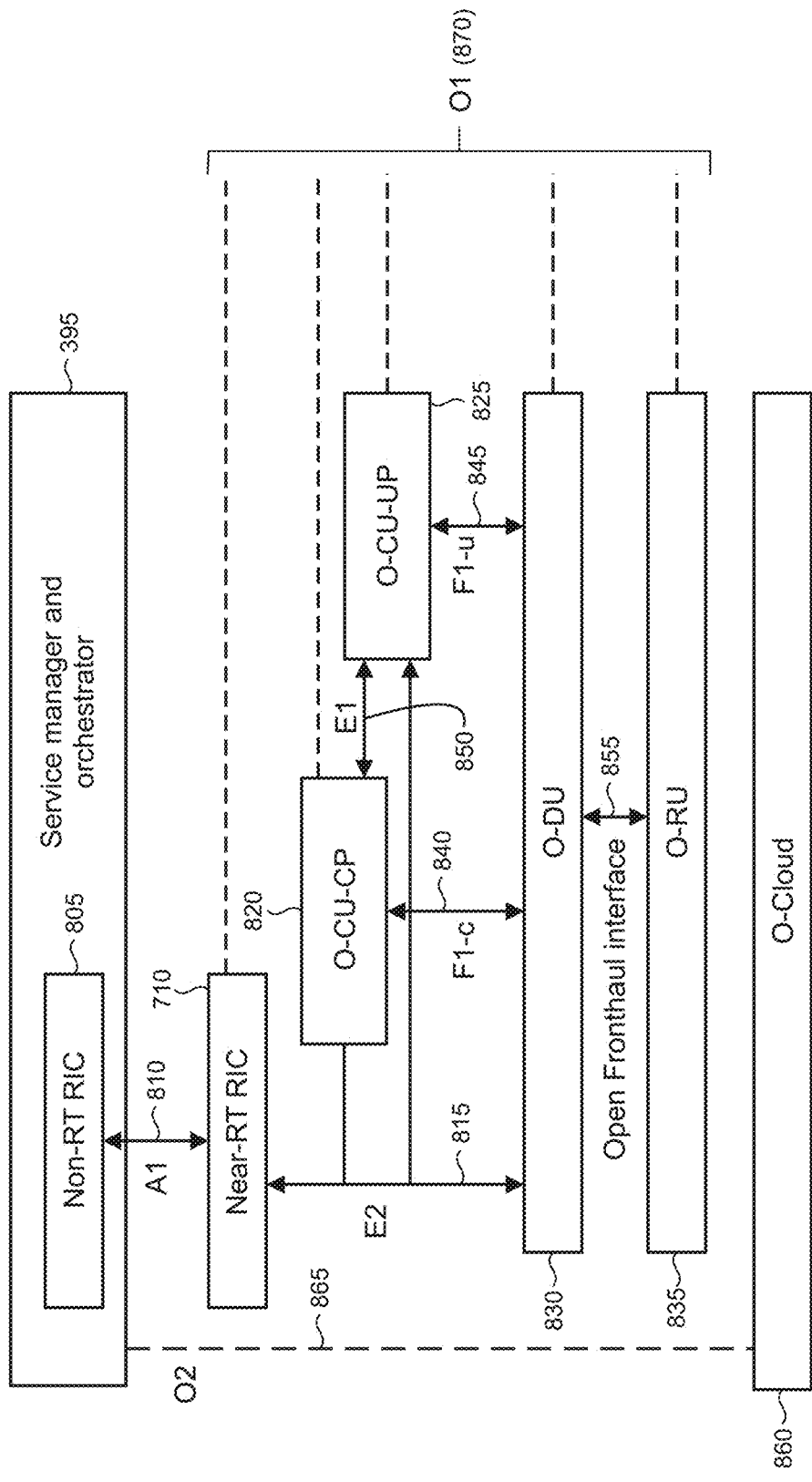
FIG. 8 shows an illustrative RAN operations and maintenance (OAM) logical architecture as described by the O-RAN Alliance.

FIG. 8 shows an illustrative RAN operations and maintenance (OAM) logical architecture 800, as described by the O-RAN Alliance. In the drawing, the "O" prefix indicates the O-RAN implementation for the functional elements of the architecture. The O-RAN Alliance defines and maintains the A1, E2, O1, O2, and Open Fronthaul interfaces discussed below. As shown, a non-RT RIC 805 may be incorporated into the service manager and orchestrator 395. The non-RT RIC interoperates with a near-RT MC 710 through an A1 interface 810.

The near-RT MC 710 is coupled over an E2 interface 815 with network functions for radio access for control and optimization including the O-CU-CP (O-RAN Central Unit-Control Plane) 820, O-CU-UP (O-RAN Central Unit-User Plane) 825, and O-DU 830. The O-CU-CP and O-CU-UP are respectively coupled to the O-DU over F1-c and F1-u interfaces, 840 and 845, as defined and maintained by 3GPP. The O-CU-CP is coupled to the O-CU-UP over a 3GPP E1 interface 850. The O-DU and O-RU 835 are coupled using an Open Fronthaul interface 855 (also known as the lower layer split (LLS) interface).

The O-Cloud 860 is a cloud computing platform comprising a collection of physical infrastructure nodes that meet O-RAN requirements to host the relevant O-RAN functions (i.e., near-RT RIC, O-CU-CP, O-CU-UP, and O-DU), the supporting software components (such as Operating System, Virtual Machine Monitor, Container Runtime, etc.), and the appropriate management and orchestration functions to create virtual network instances and map network functions. The O-Cloud is coupled to the service manager and orchestrator 395 over the O2 interface 865. An O1 interface 870 is provided to each of the near-RT MC, O-CU-CP, O-CU-UP, O-DU, and O-RU, as shown in FIG. 8.

Figure 9:
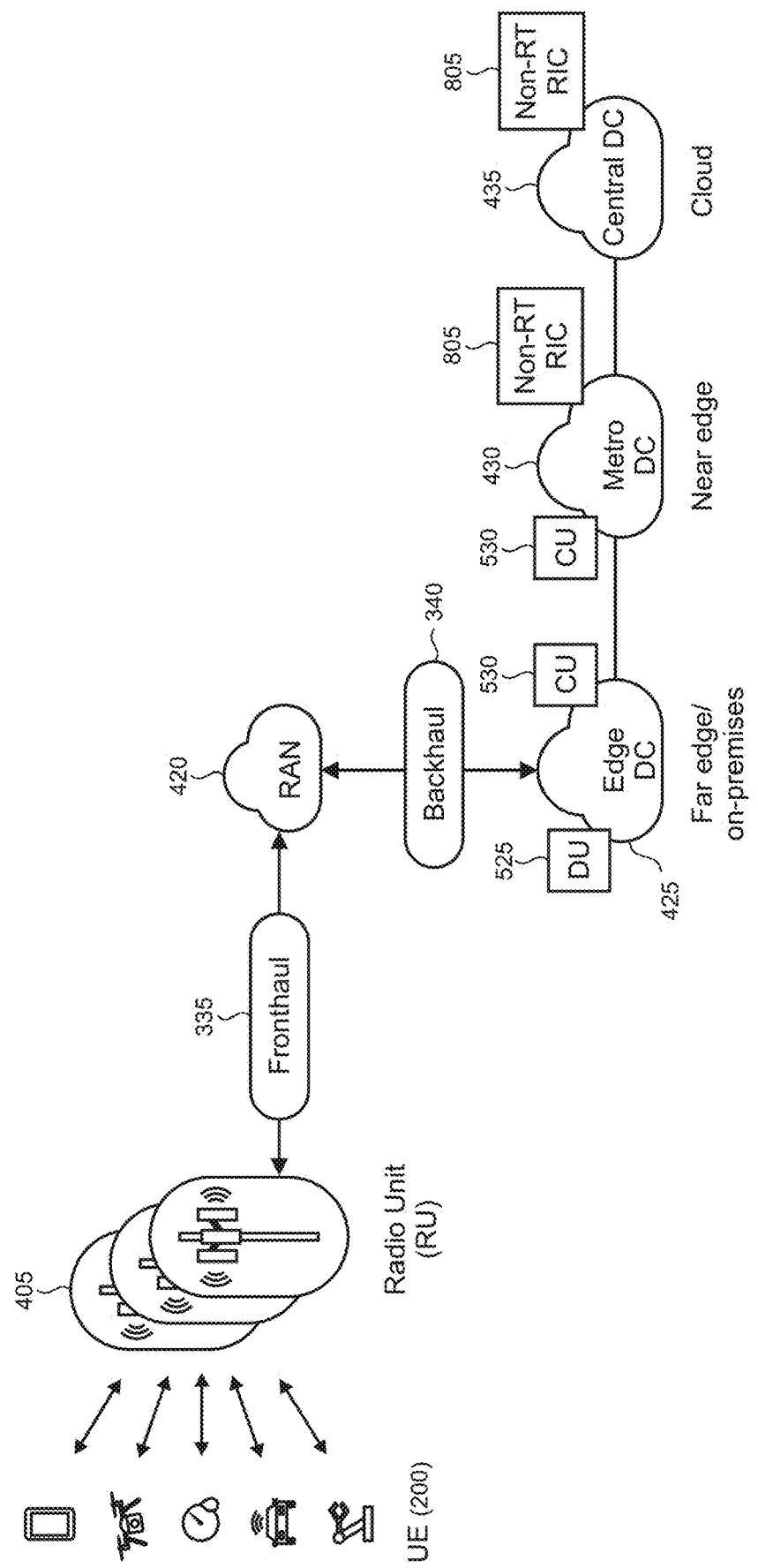
FIG. 9 shows an illustrative 5G network implementation in which split-RAN functional units and instances of the non-real-time RIC (non-RT RIC) may be distributed among physical infrastructure components.

The splitting of functional elements among the DU, CU, near-RT MC, and non-RT MC, as discussed above, enables flexible deployment of instances of such elements in the physical infrastructure that underlies a typical 5G network. FIG. 9 shows an illustrative implementation in which split-RAN functional units and instances of the non-RT RIC may be distributed among physical infrastructure components of a 5G network 400. For example, as shown, a DU 525 and CU 530 may be located at the edge DC 425. A CU 530 and non-RT RIC 805 may be located in the metro DC 430. The central DC 435 can also host a non-RT MC in some cases.

Figure 10:
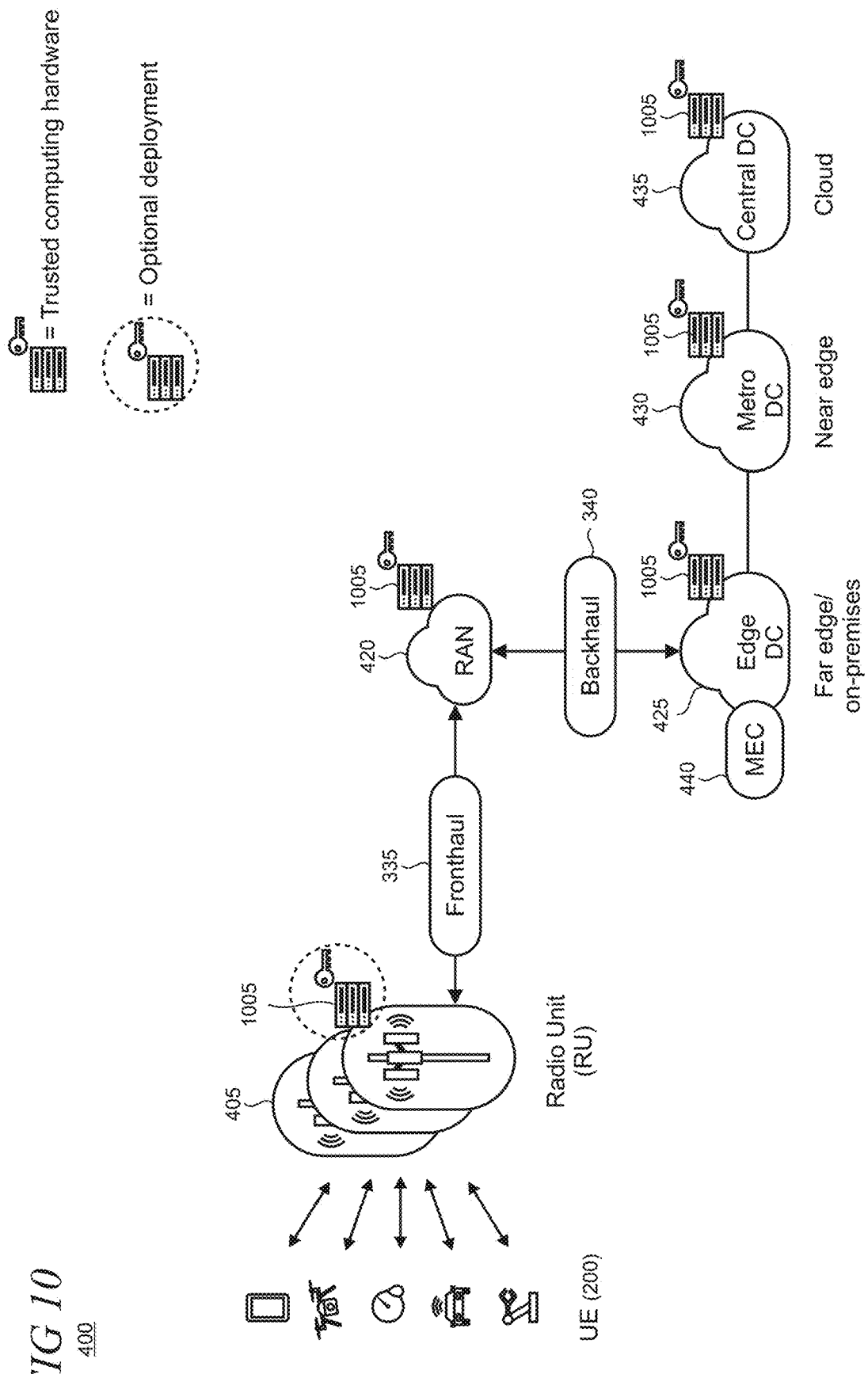
FIG. 10 shows an illustrative 5G network implementation in which trusted computing hardware is distributed among physical infrastructure components.

FIG. 10 shows an illustrative implementation in which instances of trusted computing hardware 1005 are distributed among physical infrastructure components of a 5G network 400 that were previously described above in the text accompanying FIG. 4. The trusted computing hardware may be deployed in various nodes of the 5G network including the RAN 420 and the datacenters 425, 430, and 435 supporting the mobile core and cloud networks, as shown, to provide secure end-to-end data communications over the network. However, it will be appreciated that the principles of the present trusted 5G network slices may be individually applied to particular constituent portions of a 5G network (e.g., RAN, mobile core, cloud network, etc.) on an individual basis. For example, trusted computing hardware may be utilized to provide trusted slices of the air interface of the RAN.

Nodes provide connection points for data transmission on the 5G network and may comprise redistribution points and endpoints that are each configured to creating, receiving, and/or transmitting data over a 5G communication channel. For example, nodes may comprise application and network servers, gateways, routers, hubs, switches, and the like. In some implementations, trusted computing hardware may be optionally deployed in one or more RUs 405. The trusted computing hardware comprises physical computing infrastructure that supports one or more components of a communications protocol stack to support the present trusted slices as described below.

Figure 11:
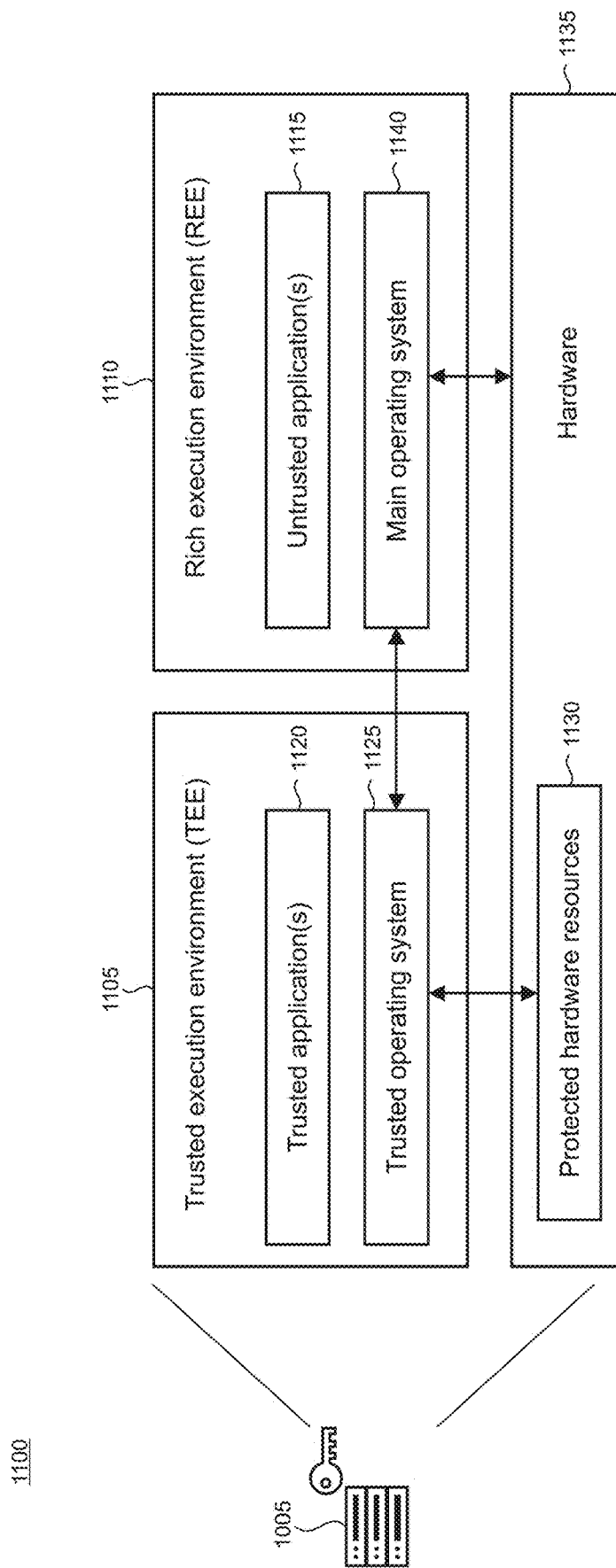
FIG. 11 shows an illustrative trusted computing hardware architecture in which a trusted execution environment (TEE) is implemented as a complement to a rich execution environment (REE)

FIG. 11 shows an illustrative architecture 1100 for trusted computing hardware 1005 in which a trusted execution environment (TEE) 1105 is implemented as a complement to a rich execution environment (REE) 1110. A TEE is an environment in which executed code and accessed data are isolated and protected in terms of confidentiality (no one has access to the data) and integrity (no one can change the code and its behavior). Any data in the TEE cannot be read or tampered with by any code outside that environment. The TEE may be implemented as a secure or trusted enclave on a 5G network node to protect sensitive information and offer protection to software execution using encryption for memory, data networking, and storage. By comparison, the REE uses standard components that, while typically supporting a richer feature set, can be vulnerable to malicious attacks in some cases.

Trusted computing may refer to various techniques and initiatives to support increased security that typically utilizes hardware-based TEEs using one or more cryptographic techniques. A trusted computing base (TCB) refers to all of a system's hardware, firmware, and software components that provide a secure environment. The components inside the TCB are considered "critical." If one component inside the TCB is compromised, the entire system's security may be jeopardized. A lower TCB means higher security—there is less risk of exposure to various vulnerabilities, malware, attacks, and malicious people. Thus, the use of TEEs reduce a given TCB to trusted runtime binaries, code, and libraries.

Trusted computing technology provides the hardware support needed to bootstrap trust in a computer by providing system designers with four main abstractions. First, strong identities let the computer be uniquely identified without having to trust the operating system or the software running on the computer. Second, trusted boot produces a unique fingerprint of the software platform running on the computer. The fingerprint may comprise hashes of software platform components (e.g., BIOS (basis input/output system), firmware controlling the computer's devices, bootloader, operating system) computed at boot time. Third, the fingerprint can be securely reported to a remote party using a remote attestation protocol—this protocol enables the remote party to authenticate both the computer and the software platform so it can assess whether the computer is trustworthy, for example, if it is a trusted platform that is designed to protect the confidentiality and integrity of data. Fourth, sealed storage enables the system to protect persistent secrets (e.g., encryption keys) from an attacker with the ability to reboot the machine and install a malicious operating system that can inspect the disk—the secrets are encrypted so that they can be decrypted only by the same computer running the trusted software platform specified upon encryption.

In a system with a TEE 1105, as shown in FIG. 11, untrusted applications 1115 run in the REE 1110, while trusted applications 1120 run in the TEE on a trusted operating system 1125. Trusted applications have complete access to main processors, peripherals, and memory, while the implementation of protected hardware resources 1130 in a hardware layer 1135 of the architecture provides isolation and protection from the untrusted applications that run on main operating system 1140. Hardware implementations for the TEE may include, for example and without limitation, ARM TrustZone, Intel Software Guard Extensions (SGX), AMD Platform Security Processor (PSP), Apple Secure Enclave Processor (SEP), Google Titan M, and the like.

In alternative implementations, one or more trusted platform modules (TPMs), or other suitable trusted computing technology, may be utilized to support a TEE. In alternative implementations, environments other than TEEs may be utilized to support the present inventive principles disclosed herein. For example, it may be appreciated that a variety of computing technologies that protect the confidentiality and integrity of code and data may be adapted to implement trusted and/or confidential computing paradigms to implement trusted slices and enhance security for 5G network slicing by, for example, securing control plane operations or isolating physical slice resources, as discussed below. One illustrative example of such alternative implementation may include one or more hardware security modules (HSMs), however it may be appreciated that devices using a suitable form of secure cryptoprocessor may also be utilized in some cases.

Figure 12:
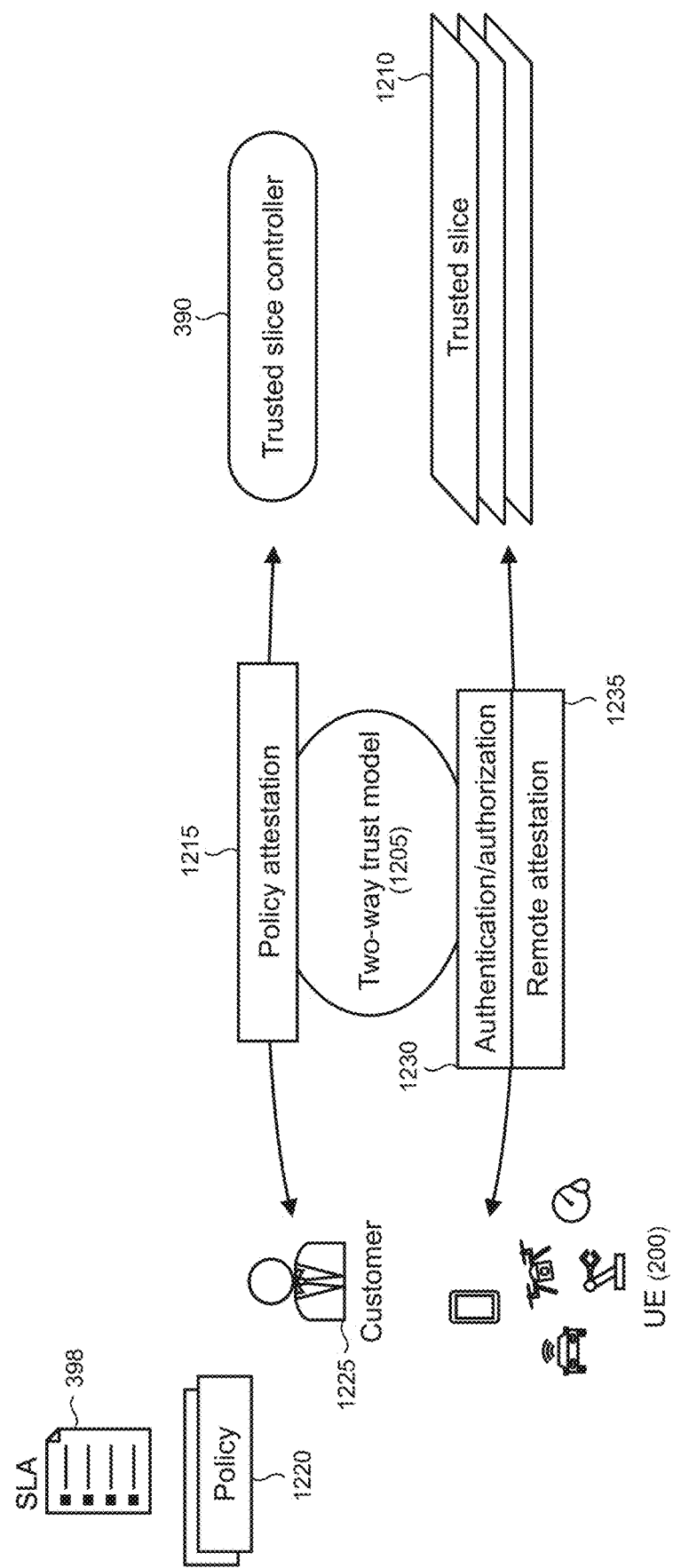
FIG. 12 shows an illustrative two-way trust model that may be implemented with the present trusted 5G network slices.

FIG. 12 shows an illustrative two-way trust model 1205 that may be implemented with trusted 5G network slices 1210 using the trusted slice controller 390 that may be instantiated using trusted computing hardware 1005 that is described above. The trusted slice controller, or another trusted component, may be configured to provide attestation 1215 that a given trusted slice conforms to one or more policies 1220 associated with a 5G network services customer 1225. Policies may be a component of an SLA 398 or be separate from an SLA.

A policy 1220 can deal with, for example, slice properties pertaining to service types (standardized or customized), geographic area of operations, and attributes associated with software, firmware, and hardware used in the infrastructure of nodes in a trusted slice. Particular values of the properties describing a slice configuration may be measured, digested, and attested to the customer to provide assurances that the slice configuration conforms with the policy. The model 1205 is implemented as a two-way model because slice properties are verified by a 5G service provider while the customer 1225 ensure that only UE 200 that successfully undergo an authentication and authorization process 1230 will access a trusted slice 1210.

Processes for remote attestation (as indicated by reference numeral 1235) may be implemented between a trusted slice 1210 and users (e.g., UE 200, customer 1225, etc.). Remote attestation uses evidence from the trusted slice to validate its security standards, confirm the integrity of code running on the slice, and evaluate its configuration against the applicable policy 1220. Remote attestation may run in a TEE enabled on the trusted slice, for example in a trusted enclave and/or using other trusted computing hardware. Remote attestation may verify that binaries were properly instantiated on the trusted slice so that users relying on remote attestation can be confident that only such intended software is running on the slice, without having been tampered with, and the slice is configured per policy.

The trusted slice 1210 can produce a certificate, attestation token (i.e., cryptographic proof for claims-based applications), or other suitable evidence of trust to remotely attesting entities. Typically, the remote attestation 1235 uses encrypted communications so that, for example, only the UE 200 requesting attestation can decrypt and read the information to prevent eavesdropping.

Figure 13:
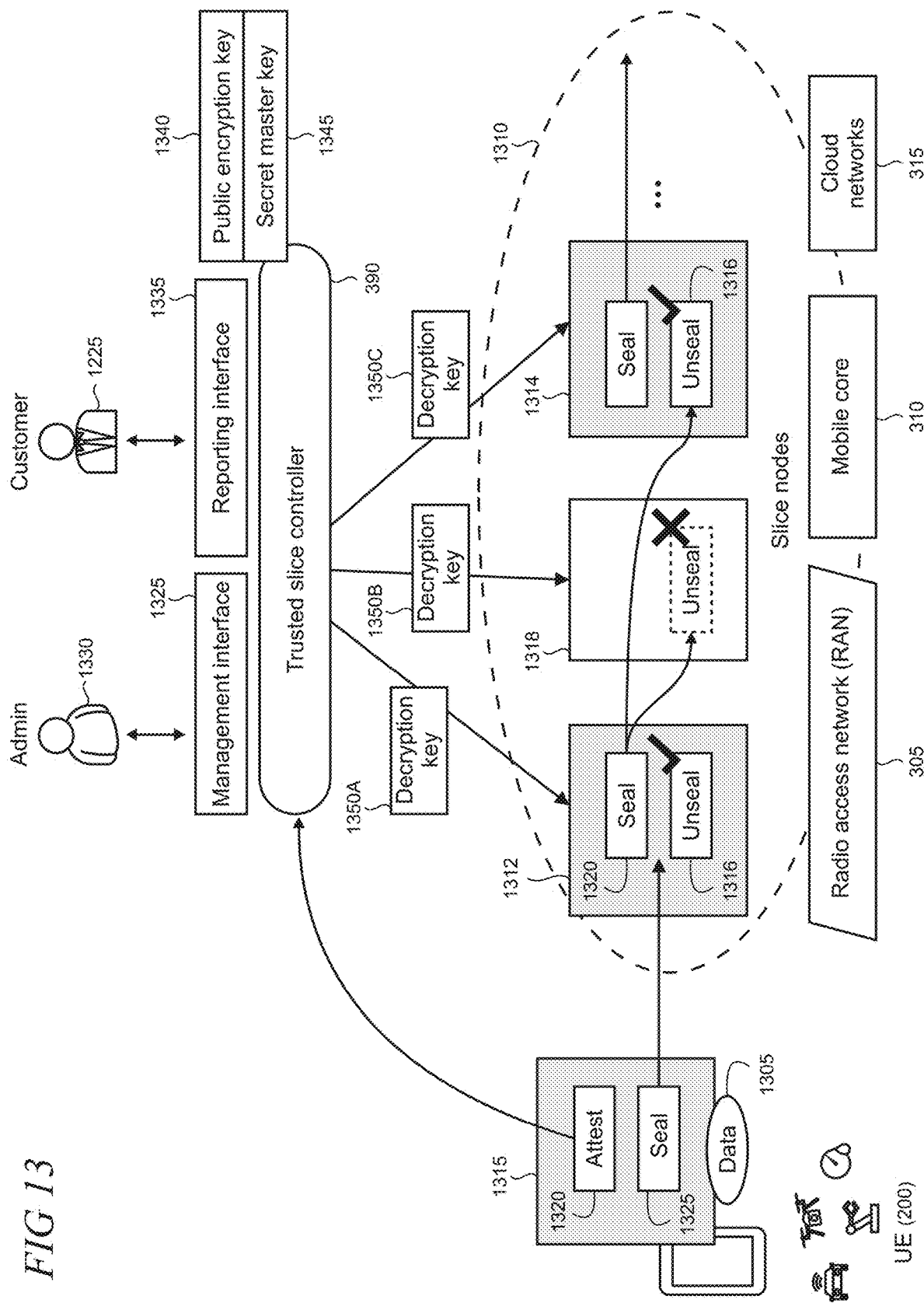
FIG. 13 shows an illustrative arrangement in which UE data transmissions may be bound to a trusted network slice using cryptographic security primitives including sealing and unsealing operations.

FIG. 13 shows an illustrative arrangement in which data transmissions 1305 from UE 200 may be bound to a trusted network slice using security primitives including cryptographic sealing and unsealing operations. The primitives may be implemented, for example, in a library that is accessible and used by suitable client-side components on both the UE associated with the customer 1225 and nodes 1310 associated with one or more slices that may be implemented across one or more elements of a 5G network (e.g., RAN 305, mobile core 310, and cloud networks 315).

Upon attesting the trusted slice controller 390 (or some other trusted component in the 5G network), a client-side component 1315 on the UE 200 can seal the data transmission 1305, as respectively indicated by reference numerals 1320 and 1325. However, the customer-side client does not expose the unseal primitive 1320 because the concept of configuration is applicable only to slice nodes. Successful attestation returns a public encryption key, as described below, and suitable certificates to validate the slice controller as trusted.

The trusted slice controller 390 may run a remote attestation protocol to obtain fingerprints and identities of nodes in a slice and translate these to a slice node configuration by consulting a suitable internal database (not shown). The node configuration, which expresses physical characteristics, like hardware or location, and software features as a set of attributes, is then encoded as credentials that are sent to the node from the trusted slice controller. These credentials are required by slice nodes to unseal policy-sealed data and are destroyed whenever the nodes reboot.

As shown in FIG. 13, only slice node-side clients 1312 and 1314 are able to unseal the data, as indicated by reference numeral 1316, as they satisfy the applicable policy in the illustrative example while node-side 1318 is unable to unseal the data by failing to satisfy the applicable policy. For example, the configuration of the node 1310 may not meet policy requirements for some technical parameter (e.g., throughput, latency, reliability, etc.), may comprise non-compliant and/or untrusted hardware, or may be located in an area that does not meet a requirement that slice nodes fall within a particular geographic boundary. The slice nodes which can successfully unseal the data can reseal the data using a public encryption key 1340 to reseal the data and forward as appropriate. Accordingly, a destination is provided with suitable credentials to reseal the data that is sent back to the trusted slice. Data traffic in both directions therefore remains bound to the slice in accordance with the trust model.

The trusted slice controller 390 may be configured with a management interface 1325 to enable an administrator 1330 to configure the fingerprints of the sliced nodes, for example, as new nodes are deployed in the 5G network. The trusted slice controller may also be configured with a reporting interface 1335 that provides the customer 1225 with the appropriate assurances that the trusted slices applicable policies. For example, configuration information for each of the trusted slices may be collected, digested, and then reported to the customer over the reporting interface to thereby provide assurances that slice properties do not depart from applicable customer policies and agreements.

The trusted slice controller 390 may be configured to use various cryptographic methodologies to implement various features of the present trusted 5G slices. For example, a ciphertext policy attribute-based encryption (CPABE) may be utilized in which a pair of keys including a public encryption key 1340 and secret master key 1345 are generated and securely stored. Unlike traditional public key schemes, the public encryption key allows a piece of data to be encrypted and bound to the policy 1220 (FIG. 12). The policy may be viewed as a logical expression that uses conjunction and disjunction operations over a set of terms. Each term tests a condition over an attribute, which can be a string or a number; both types support the equality operation, but the numeric type also supports inequalities (e.g., a=x or b>y).

The trusted slice controller 390 can create an arbitrary number of decryption keys 1350A, 1350B, and 1350C from the same secret master key 1345, each of which can embed a set of attributes specified at creation time. The encrypted data can be decrypted only by a decryption key whose attributes satisfy the policy (e.g., keys embedding the attribute a=x can decrypt a piece of data encrypted with the preceding example policy).

It is noted that the CPABE scheme is intended to be illustrative and other encryption methodologies may be utilized to meet the needs of a particular implementation of the present trusted slices. For example, symmetric encryption may be utilized in which the trusted slice controller 390 evaluates the applicable policies. Upon sealing, a client encrypts the data with a symmetric key and sends this key and the policy to the trusted slice controller which then encrypts this key and the policy with a secret key and returns the outcome to the client. To unseal, the encrypted key is sent to the monitor, which internally recovers the original symmetric key and policy, evaluates the policy, and releases the symmetric key if the node satisfies the policy.

An alternative design is to evaluate the policies on the client side using public-key encryption. Each slice node receives from the trusted slice controller a set of private keys that match its configuration. In this scheme, each key corresponds to an attribute-value pair of the configuration. Sealing is done by encrypting the data with the corresponding public keys according to the attributes defined in the policies.

Figure 14:
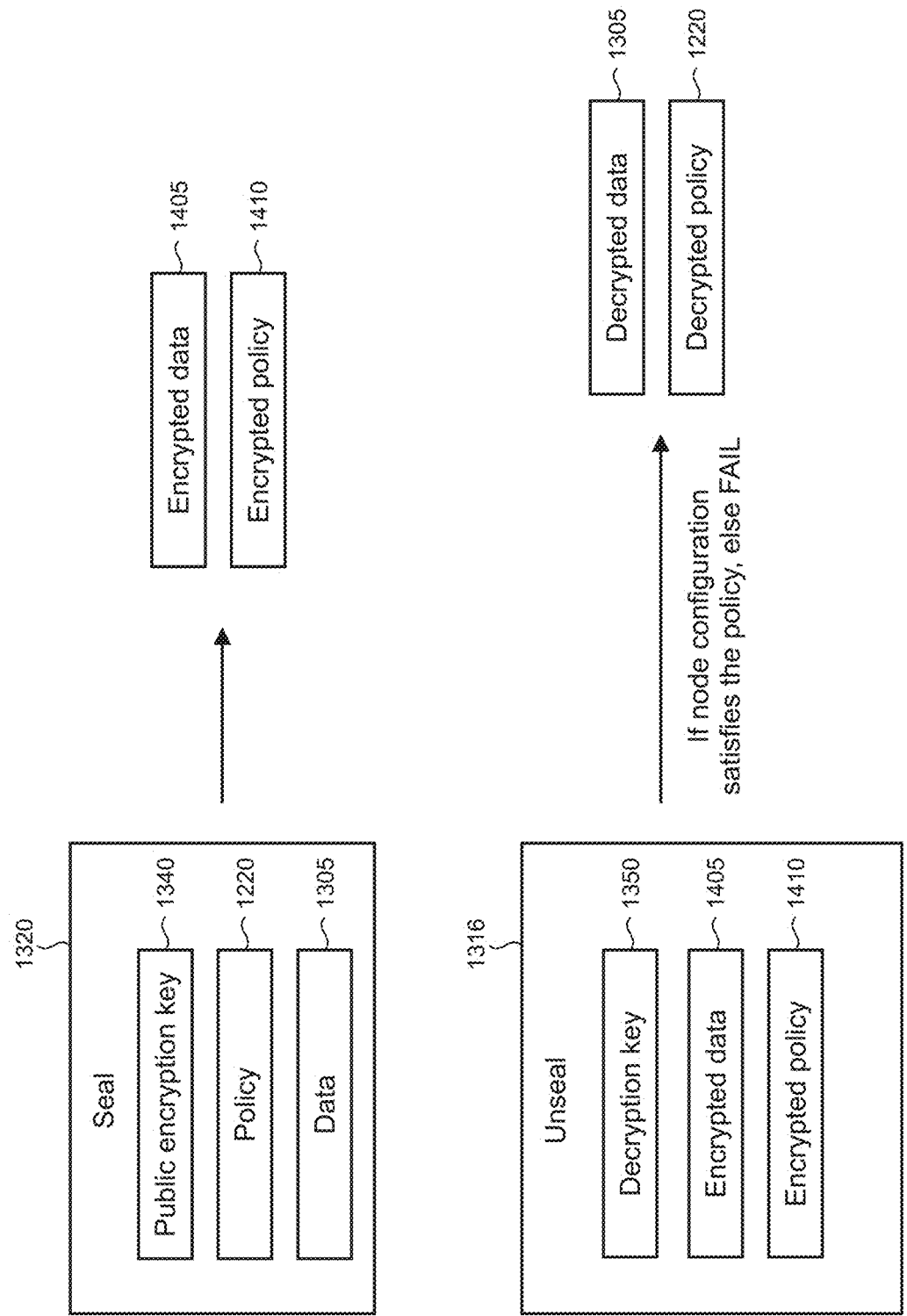
FIG. 14 shows illustrative details of cryptographic sealing and unsealing.

FIG. 14 shows illustrative details of cryptographic sealing and unsealing. The seal primitive 1320 takes the public encryption key 1340, policy 1220, and data 1305 as arguments and generates encrypted data 1405 and an encrypted policy 1410. The unseal primitive 1316 may take the decryption key 1350, encrypted data 1405, and encrypted policy 1410 as arguments and generate decrypted data 1305 and decrypted policy 1220 if the slice node satisfies the policy. Data may then be resealed using the customer's policy. In some implementations, additional levels of encryption may be performed, or additional argument may be utilized. For example, the seal primitive may generate an envelope that includes the policy and data that are encrypted with a symmetric key, and the symmetric key itself is encrypted with the public encryption key. The unseal primitive may take the encryption public key and envelope as arguments.

Figure 15:
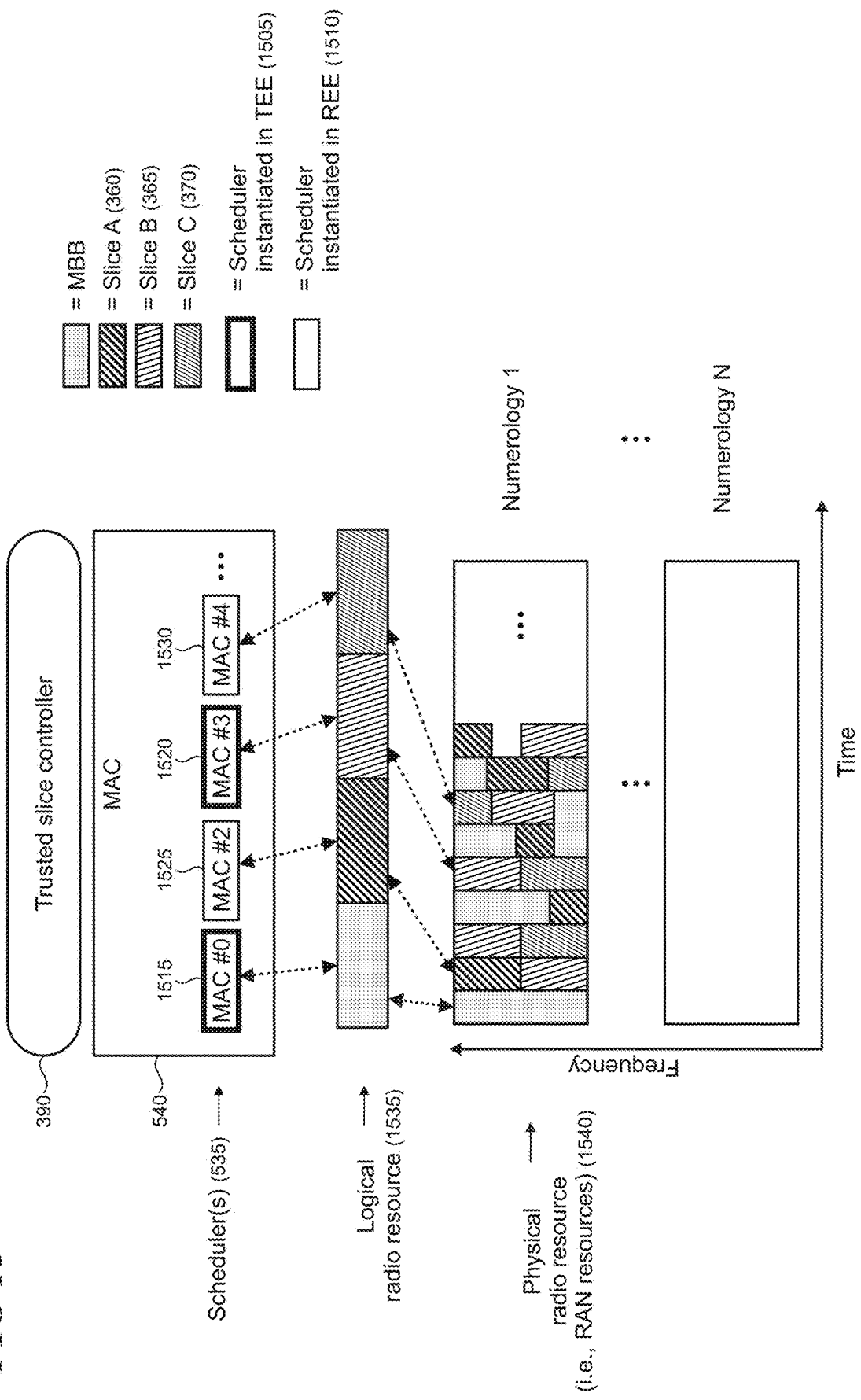
FIG. 15 shows illustrative allocation of physical radio resources among RAN slices in which MAC (medium access control) layer schedulers may be alternatively implemented in TEEs or REEs.

FIG. 15 shows illustrative allocation of physical radio resources among RAN slices in which MAC (medium access control) layer 540 and schedulers 535 may be alternatively implemented in TEEs or REEs, as indicated by reference numerals 1505 and 1510. By instantiating certain ones of MAC schedulers (e.g., elements 1515 and 1520) in trusted computing hardware, the control planes 560 (FIG. 5) for corresponding slices may be provided with enhanced security. Other MAC schedulers (e.g., elements 1525 and 1530) can be implemented in regular hardware. The protected control plane may be used in addition to or as alternative to the binding of data to trusted slices using cryptographic sealing, as discussed above, and/or end-to-end data encryption.

While MAC-based schedulers are shown in FIG. 15 and described herein, it is emphasized that the present principles may be applied to other network functions, including virtualized network functions, that may be instantiated in a trusted enclave or other trusted computing hardware to enhance control plane security, for example, for 5G network slicing scenarios. In the RAN, these network functions may relate, for example, to link adaptation, power control, interference coordination, retransmission, modulation, coding, and the like. In the mobile core, illustrative network functions including, but not limited to, for example, NSSF (network slice selection function), AMF (access and mobility management function), SMF (session management function), and PCF (policy control function), as described by 3GPP, may be implemented in trusted enclaves or other trusted computing hardware to implement aspects of slicing in some cases. It may be appreciated that various other network functions may also be instantiated using trusted computing hardware in one or more of the RAN, mobile core, or cloud of a 5G network as may be needed to meet the requirements of a particular application.

The trusted slice controller 390 may be instantiated, for example, as a component of the near-RT RIC 710 (FIG. 7)

to thereby implement or combine the functionality of the scheduler 535 (FIG. 5). In alternative implementations, part of the trusted slice controller may be distributed outside the near-RT MC, for example, in a CU in an edge or metro DC, or included in one or more other functional elements of the 5G network architecture. In some implementations, dynamically optimized RAN actions to ensure SLA guarantees may be performed in the near-RT MC while longer term SLA assurance can be handled in the non-RT MC.

The trusted slice controller 390 is arranged to control operations of the MAC component 540 based on logical representations 1535 of a radio resource in the PHY component 520 (FIG. 5). As shown, the MAC component 540 performs intra-slice resource allocation. More specifically, the physical radio resource 1540 is partitioned into multiple blocks or segments each defined by one numerology to meet certain communication requirements, such as low latency, wide coverage, etc. Numerology refers to the values of the basic physical transmission parameters, particularly including, for example, the transmission time slot length in which length of the slot is shorter for higher numerologies.

Each RAN portion of a network slice occupies a subset of physical resources taken from one or multiple numerology segments which may be represented, as shown in FIG. 15, using dimensions comprising frequency and time. In 5G, frame structures of the radio resources in the time domain are 10 ms in length irrespective of the numerology in use but may vary in width in the frequency domain. For example, a RAN slice serving automotive services in a high mobility scenario may use a wider subcarrier spacing to combat high Doppler shifts, while a RAN slice serving a latency-sensitive service such as real-time gaming may use fewer symbols in each subframe (there are 10 subframes per frame in 5G networks). It may be appreciated that spatial multiplexing, referred to as MIMO (multiple input, multiple output), may also be utilized to provide additional layers of RAN resources that the slice controller may allocate in some implementations.

Physical radio resources may be configured to further enhance security by isolating the PHY layer for the trusted slice from that of other trusted and non-trusted slices. Such isolation may be implemented, for example, by using dedicated PHY resources. For the key physical channels in the air interface of a 5G RAN, such as the physical downlink (DL) and uplink (UL) control channels, the physical random access channel and the physical shared channel, we can have slice-specific physical channels, as well as common physical channels. The common physical channels can be used by all slices, and the slice-specific physical channels are dedicated to the respective slices to thereby enable PHY resource isolation.

Figure 16:
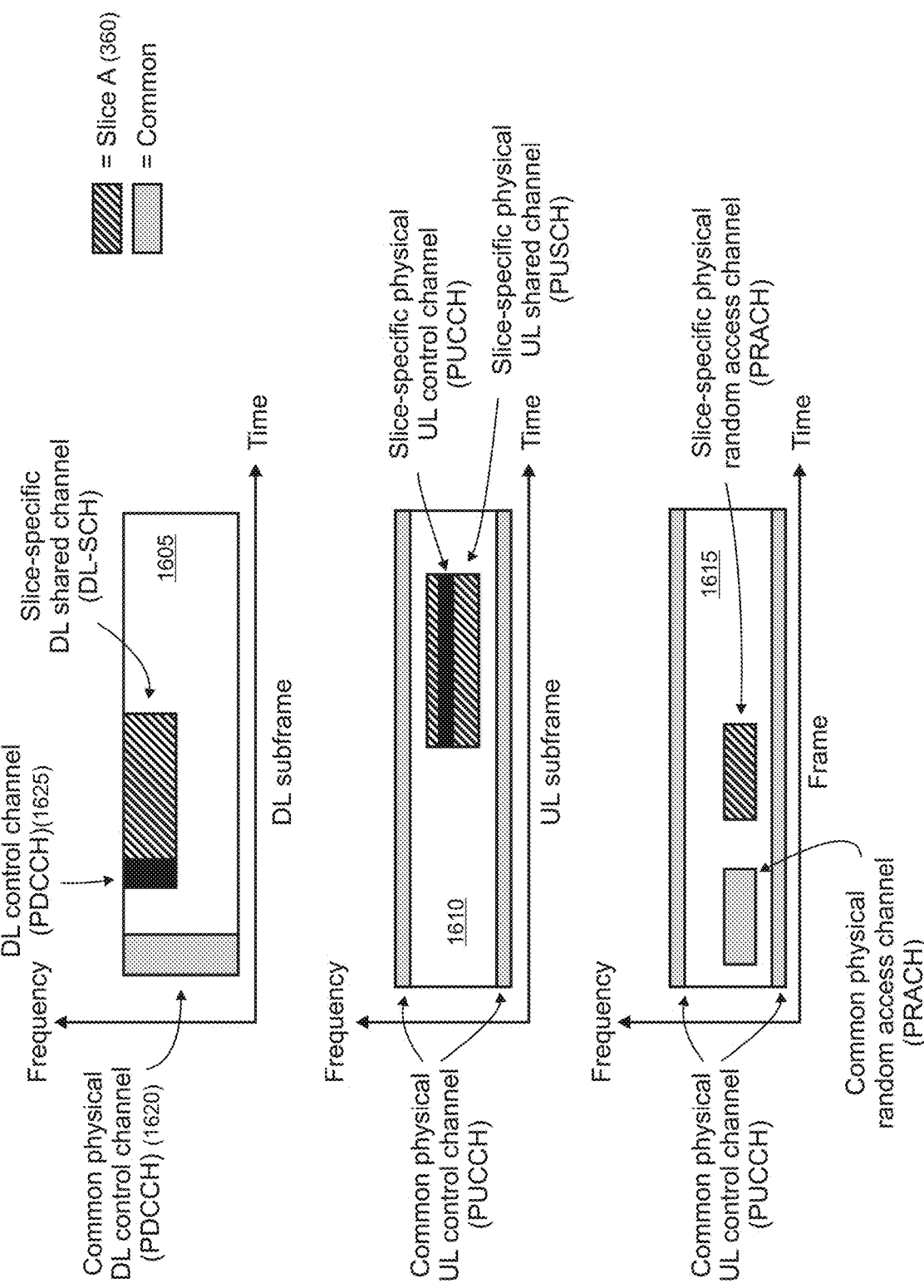
FIG. 16 shows illustrative dedicated allocation of physical radio resources to trusted slices.

FIG. 16 shows illustrative dedicated allocation of physical radio resources 1540 (FIG. 15) on a slice-specific basis for the physical downlink control channel (abbreviated as PDCCH under 3GPP) in an exemplary DL subframe 1605, the physical uplink control channel (PUCCH) in an exemplary UL subframe 1610, and the physical random access channel (PRACH) in an exemplary frame 1615.

A common PDCCH 1620 carries resource allocation information for the network slices. A network slice identifier (sNetID) may be used to address the scheduled network slices. UE accessing a scheduled network slice can detect the common physical control information addressed to the corresponding sNetID. The slice-specific PDCCH 1625 for a network slice is located in the radio resources assigned to the network slice. The slice-specific PDCCH carries scheduling information for the UE devices in the network slice. Similarly, in the uplink, common and slice-specific physical uplink control channels can be utilized. UE accessing multiple network slices can aggregate the uplink control information and transmit it using the common physical control channel.

Figure 17:
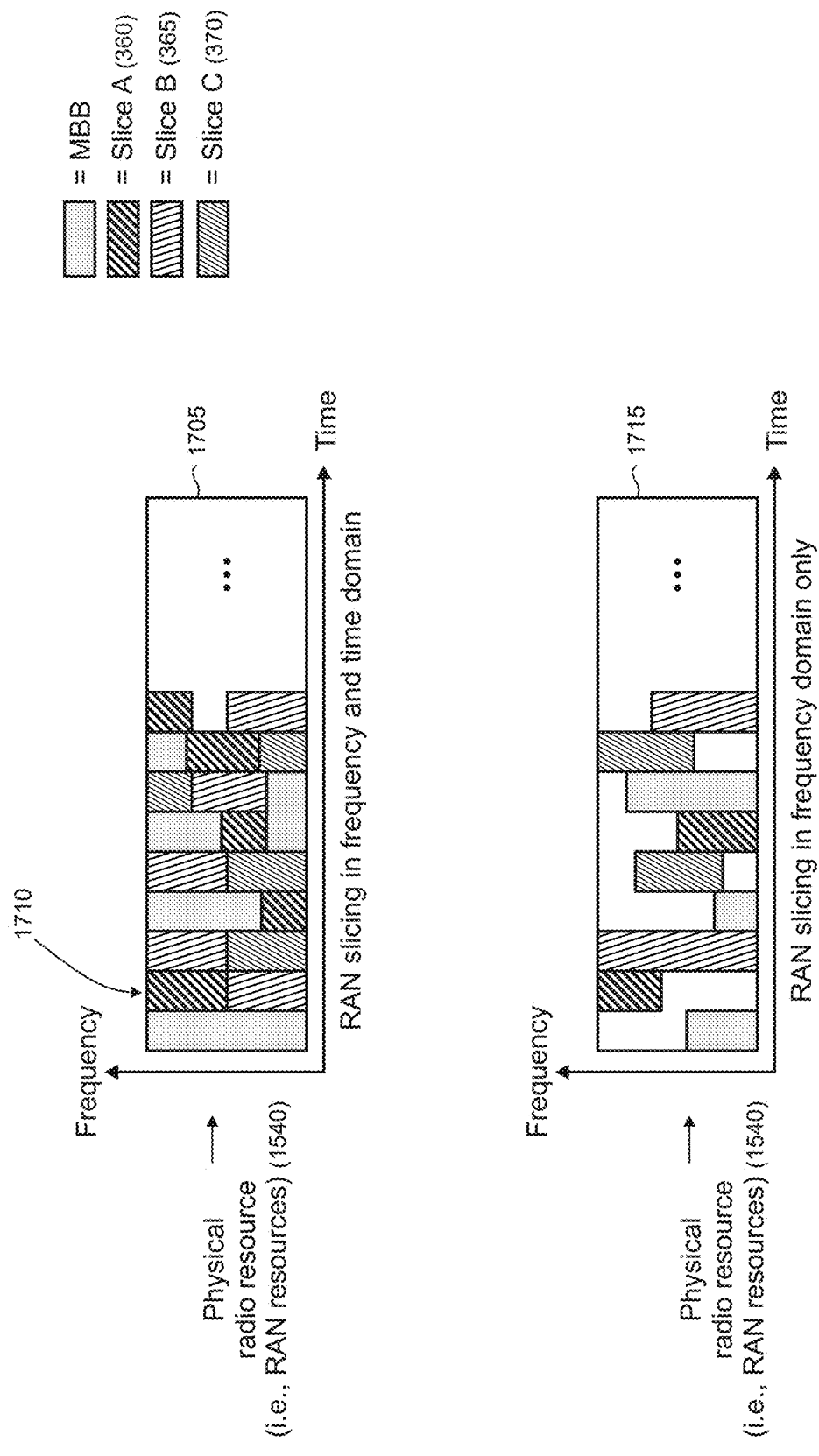
FIG. 17 shows illustrative arrangements for physical radio resource allocation in time and frequency domains, and in the frequency domain only.

PHY resources may further be isolated by limiting resource time sharing to provide temporal isolation. FIG. 17 shows illustrative arrangements for physical radio resource allocation in both time and frequency domains, and in the frequency domain only. In the first illustrative allocation 1705, radio resources are allocated to the slices in which different slices can utilize different subcarrier frequencies at the same time. For example, both Slice A and Slice B are allocated resources in the second time slot 1710. In the second illustrative allocation 1715, radio resources are allocated so that no two slices share the same time slot to thereby provide temporal isolation of each slice.

Figure 18:
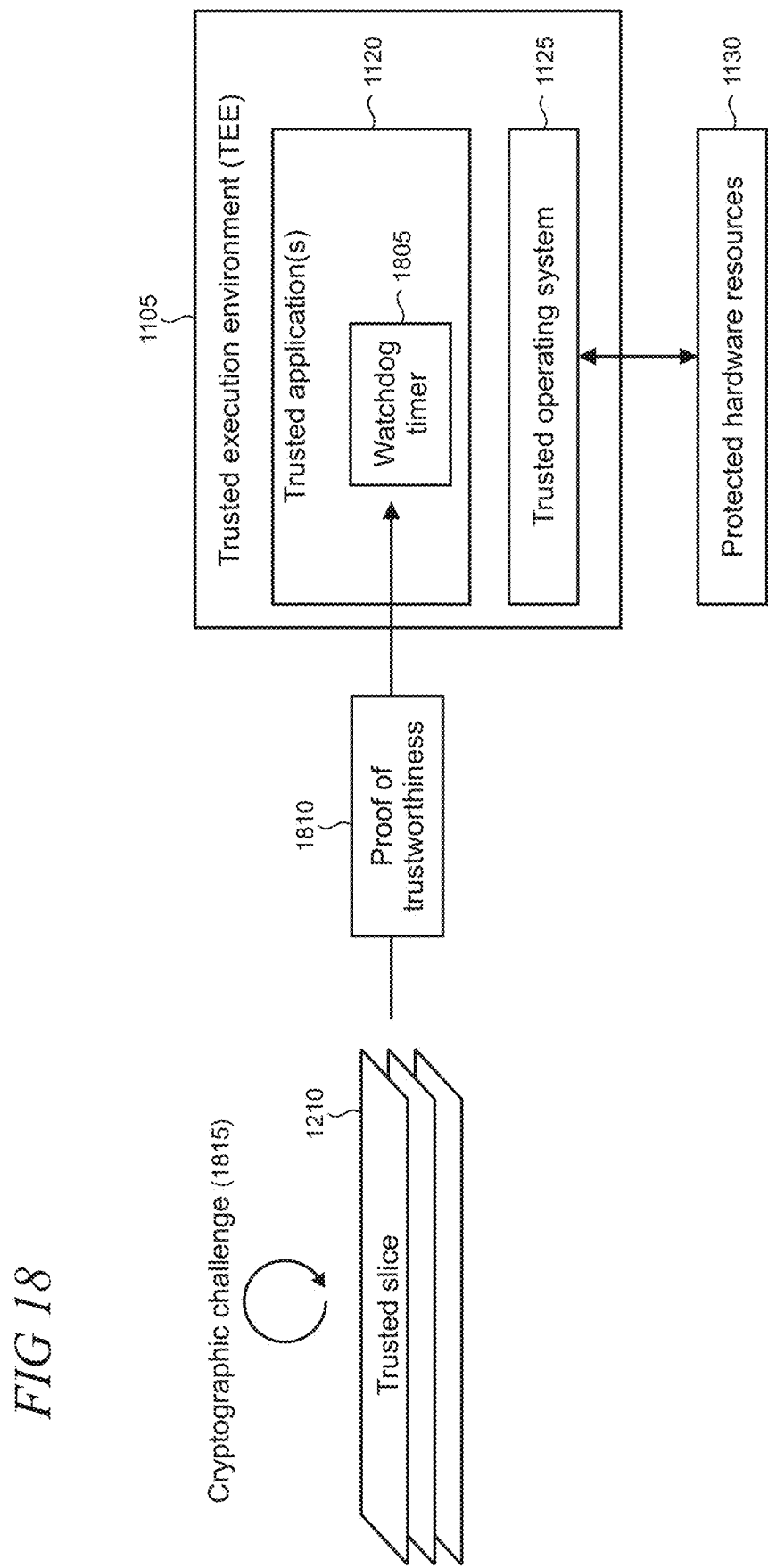
FIG. 18 shows an illustrative cryptographic watchdog timer that may be instantiated as a trusted application in a TEE.

As discussed above in the text accompanying FIG. 11, a given TEE can support various trusted applications. FIG. 18 shows an illustrative watchdog timer 1805 that may be instantiated as a trusted application 1120 in a TEE 1105 that may be instantiated in a node of a trusted slice. The watchdog timer may be configured to listen for signal from a trusted slice 1210 that is provided periodically, randomly, or on some other suitable time basis. In some implementations, the watchdog timer supports a timer that counts down from some predetermined value. When the timer reaches zero, or some other predetermined value, the watchdog timer will typically interrupt or disable slice operations as it is assumed that the slice has become corrupted or is otherwise no longer trustworthy. Receipt of the signal provides proof (as indicated by reference numeral 1810) that the trusted slice is well and remains trustworthy and thereby resets the watchdog timer to its initial value or some other suitable value. Accordingly, so long as the proof is received before the time counts all the way down, slice operations can continue without disruption from the watchdog timer.

In this illustrative example, the watchdog timer 1805 operates cryptographically. Here, the proof of trustworthiness 1810 that is needed to prevent the watchdog timer from disabling slice operations is dependent on the slice solving some cryptographic challenge 1815, or by providing other suitable attestation, to verify its identity such that the timer reset signal can be trusted.

Figure 19:
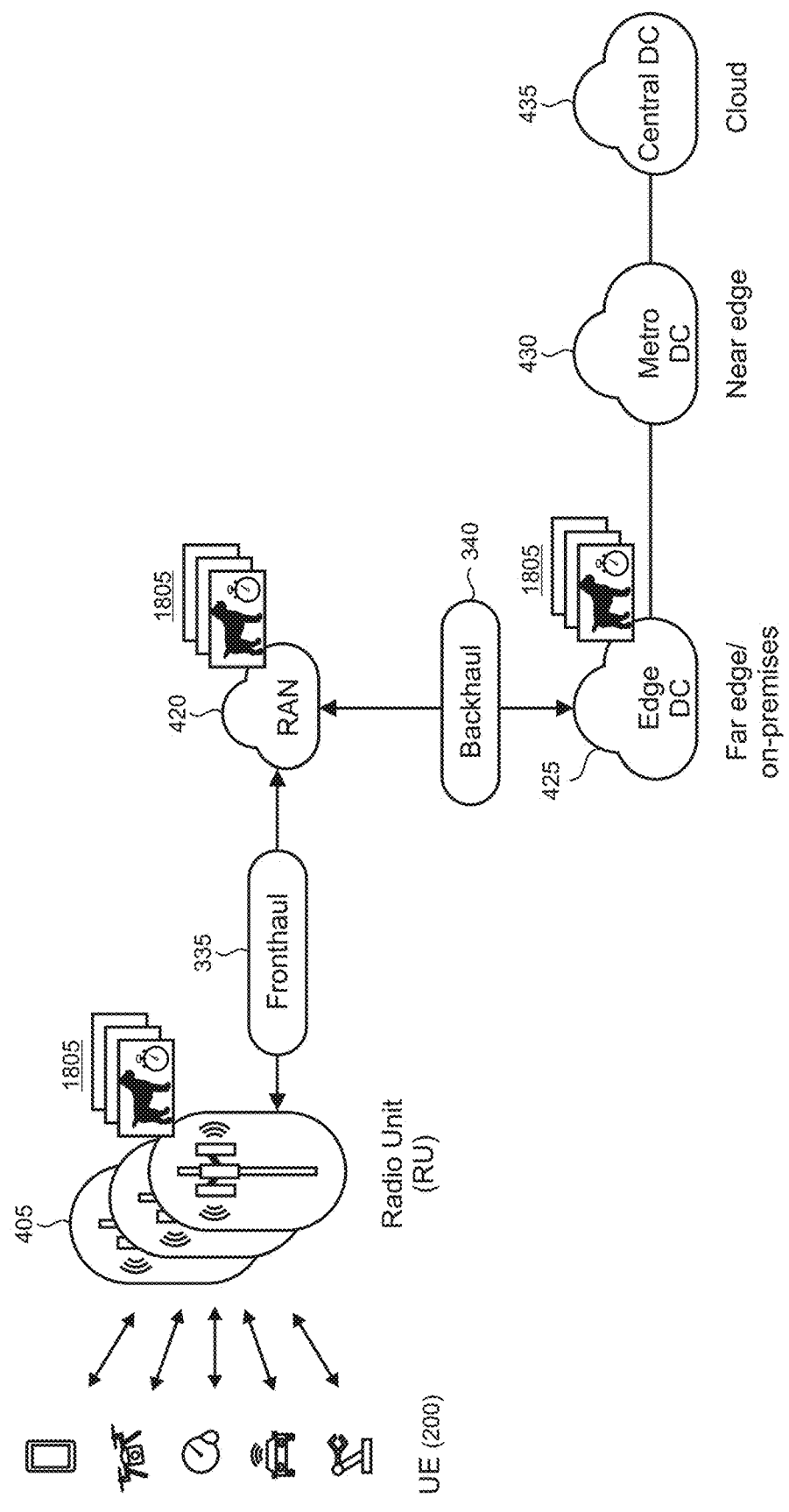
FIG. 19 shows an illustrative 5G network implementation in which cryptographic watchdog timers are distributed among physical infrastructure components.

FIG. 19 shows an illustrative 5G network implementation in which cryptographic watchdog timers 1805 are distributed among trusted computing hardware in the physical infrastructure components of a 5G network 400. In typical implementations, watchdog timers are instantiated in vulnerable infrastructure that is remotely located and/or which may be relatively sparely staffed with human personnel. In these cases, a watchdog timer may be particularly adapted to monitor for slice health and other indicators that demonstrate that continued trust in a network slice is warranted. For example, such vulnerable infrastructure may generally constitute network components and nodes that are disposed at the far edges of a 5G network rather than in the larger metro and central datacenters. However, watchdog timers can be instantiated in any 5G network node as may be required to meet a particular implementation need from RU 405 to central datacenter 435, and nodes in between.

Figure 20:
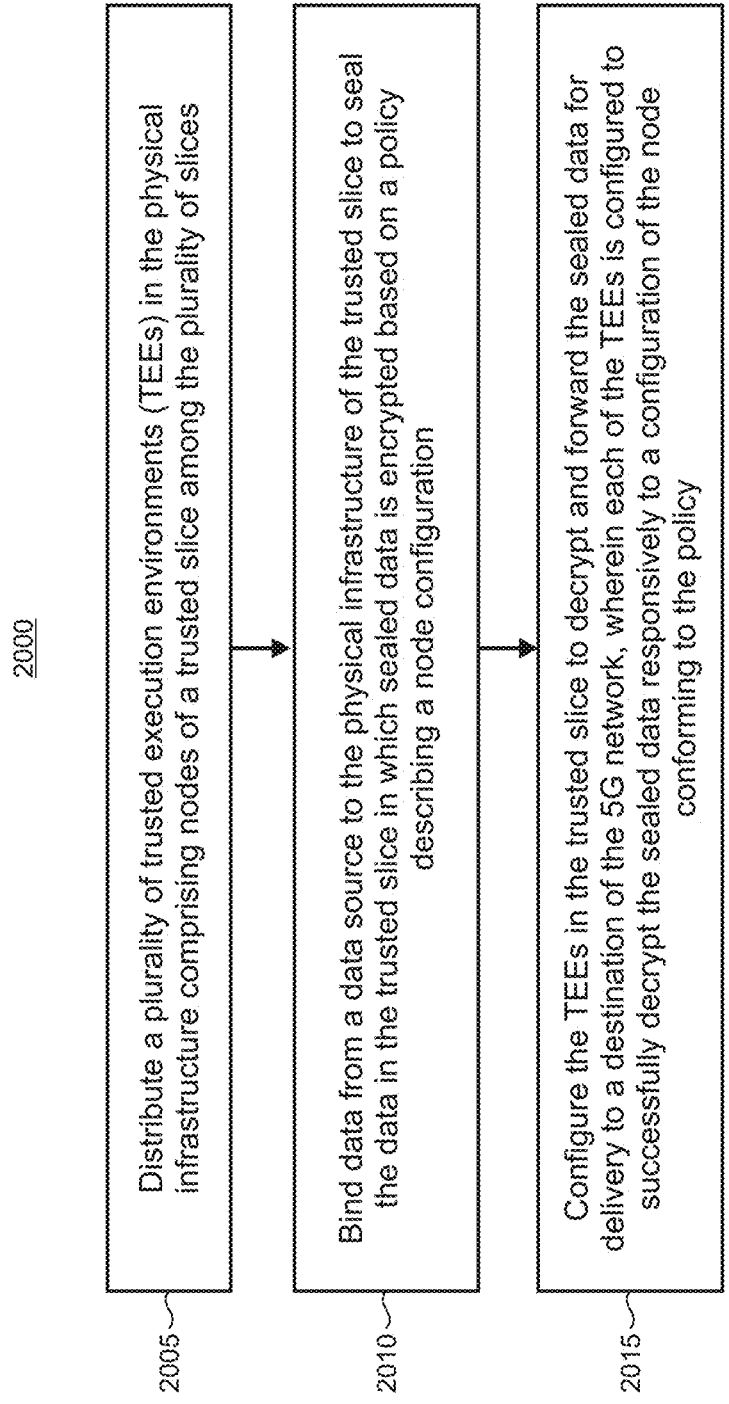
FIGS. 20, 21, and 22 show illustrative methods that may be performed when implementing the present trusted 5G network slices.

FIG. 20 is a flowchart of an illustrative method 2000 that may be performed in a 5G network having a plurality of slices. Unless specifically stated, methods or steps shown in the flowchart blocks and described in the accompanying text are not constrained to a particular order or sequence. In addition, some of the methods or steps thereof can occur or be performed concurrently and not all the methods or steps have to be performed in a given implementation depending on the requirements of such implementation and some methods or steps may be optionally utilized.

At block 2005, a plurality of trusted TEEs are distributed in the physical infrastructure comprising nodes of a trusted slice among the plurality of slices. At block 2010 data from a data source is bound to the physical infrastructure of the trusted slice to seal the data from the data source to the trusted slice in which sealed data is encrypted based on a policy describing a node configuration. At block 2015, TEEs in the trusted slice are configured to decrypt and forward the sealed data for delivery to a destination of the 5G network, wherein each of the TEEs is configured to successfully decrypt the sealed data responsively to a configuration of the node conforming to the policy.

Figure 21:
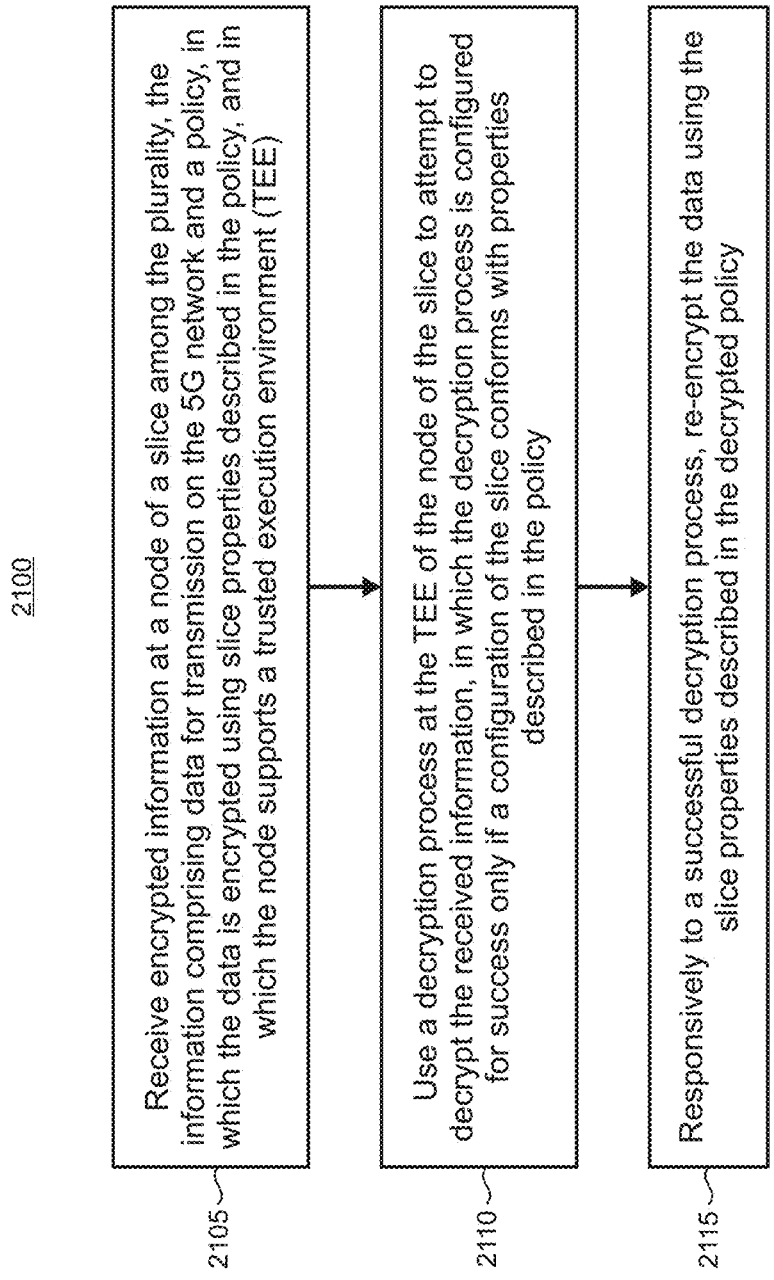

FIG. 21 is a flowchart of an illustrative method 2100 that may be performed by a computing device deployed in a 5G network having an air interface between an RU and a plurality of UE, and in which the 5G network comprises a plurality of slices. At block 2105, encrypted information is received at a node of a slice among the plurality, the information comprising data for transmission on the 5G network and a policy, in which the data is encrypted using slice properties described in the policy, and in which the node supports a TEE. At block 2110, a decryption process is used at the TEE of the node of the slice to attempt to decrypt the received information, in which the decryption process is configured for success only if a configuration of the slice conforms with properties described in the policy. At block 2115, responsively to a successful decryption process, the data is re-encrypted using the slice properties described in the decrypted policy.

Figure 22:
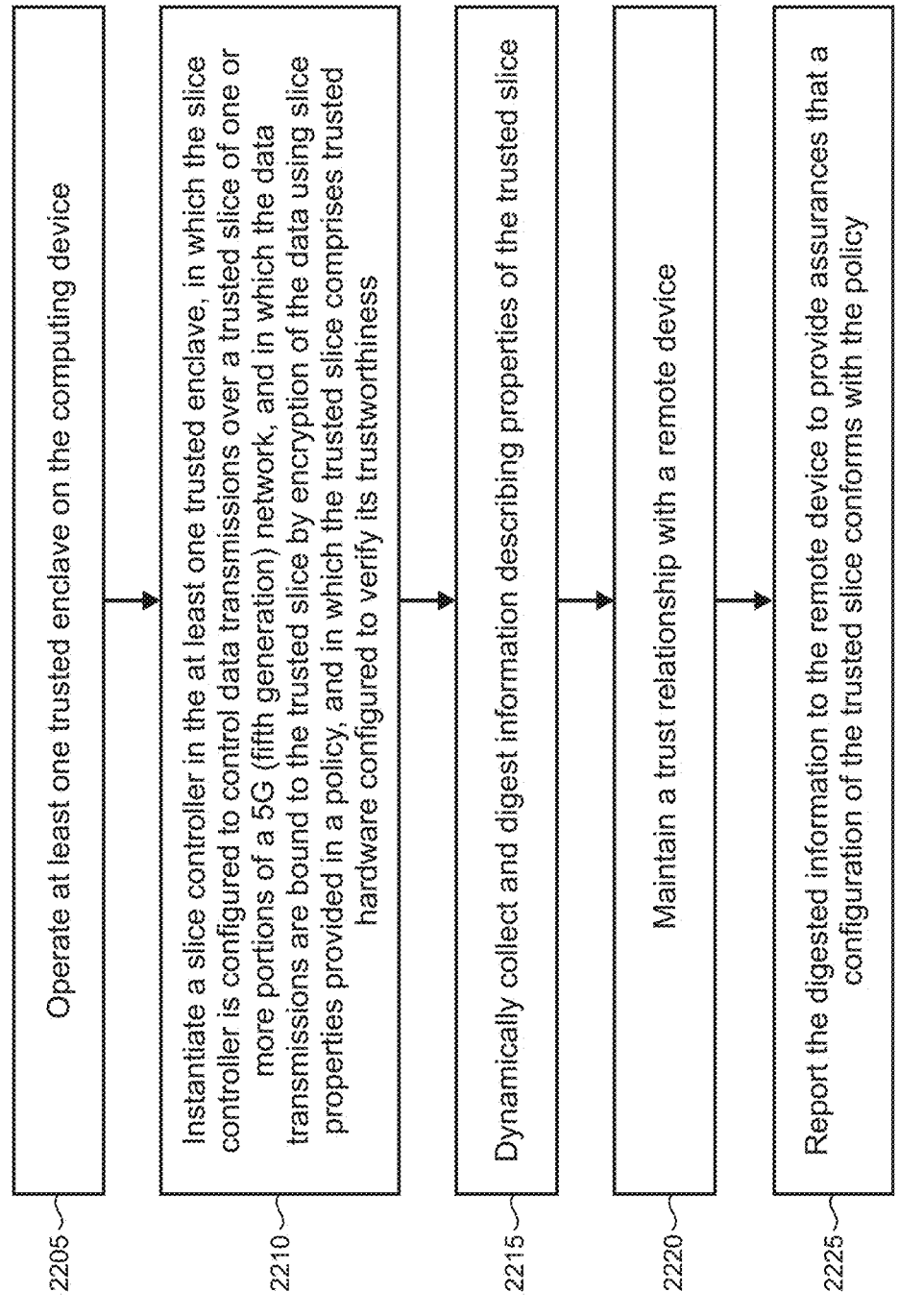

FIG. 22 is a flowchart of an illustrative method 2200 that may be performed by a computing device in a 5G network. At block 2205, at least one trusted enclave on the computing device is operated. At block 2210, a slice controller is instantiated in the at least one trusted enclave, in which the slice controller is configured to control data transmissions over a trusted slice of one or more portions of a 5G network, and in which the data transmissions are bound to the trusted slice by encryption of the data using slice properties provided in a policy, and in which the trusted slice comprises trusted hardware configured to verify its trustworthiness. At block 2215, information describing properties of the trusted slice is dynamically collected and digested. At block 2220, a trust relationship is maintained with a remote device. At block 2225, the digested information is reported to the remote device to provide assurances that a configuration of the trusted slice conforms with the policy.

Figure 23:
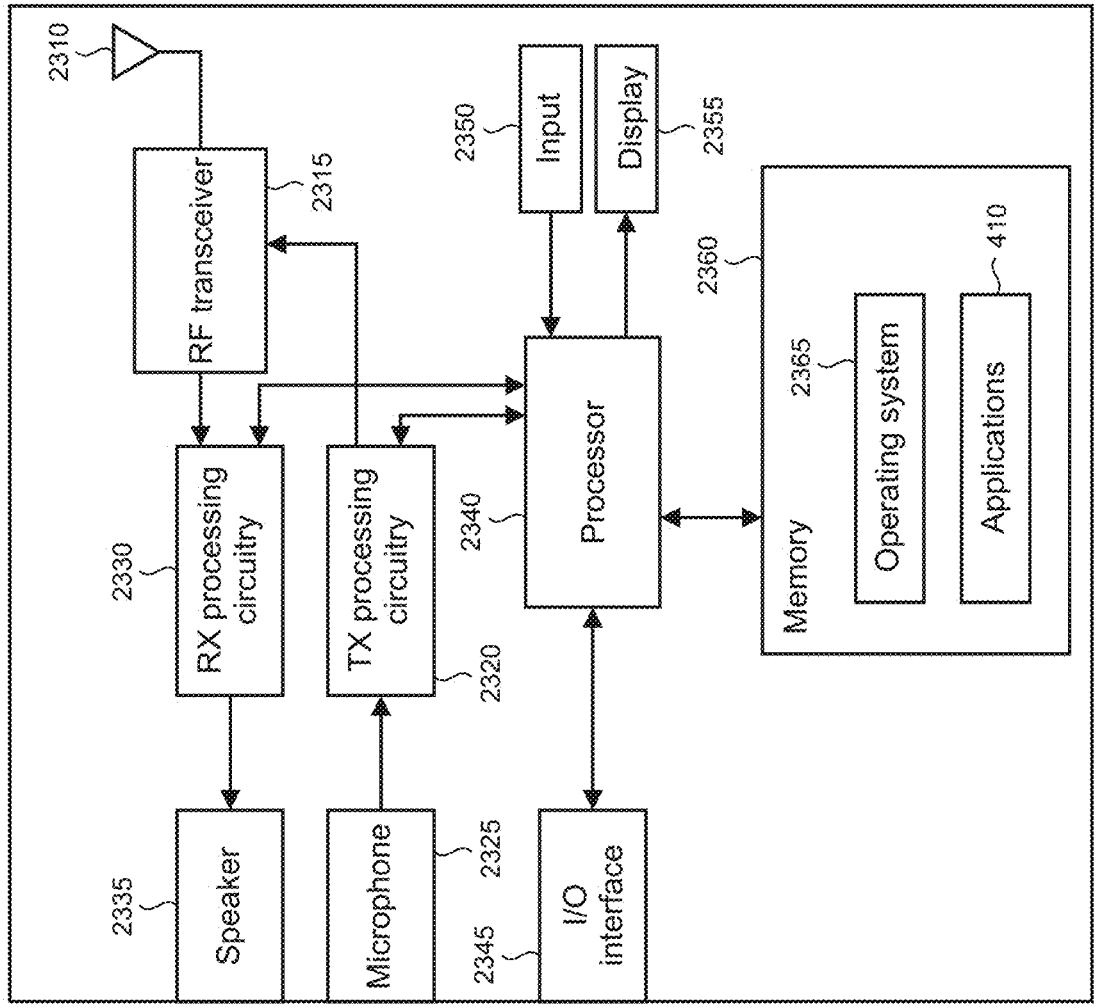
FIG. 23 is a block diagram of an illustrative UE that may be used at least in part to implement the present trusted 5G network slices.

FIG. 23 is a block diagram of an illustrative UE 200 that may be used at least in part to implement the present trusted 5G network slices. The embodiment of the UE 200 shown in FIG. 23 is for illustration only, and the UEs 200 shown in the drawings and described in the preceding text may have the same or similar configuration. However, it is noted that UEs may come in a wide variety of configurations, and FIG. 23 does not limit the scope of the present disclosure to any particular implementation of a UE.

The UE 200 includes an antenna 2310, a radio frequency (RF) transceiver 2315, transmit (TX) processing circuitry 2320, a microphone 2325, and receive (RX) processing circuitry 2330. The UE 200 also includes a speaker 2335, a processor 2340, an input/output (I/O) interface 2345, an input device 2350, a display 2355, and a memory 2360. The memory includes an operating system (OS) program 2365 and one or more applications 410.

The RF transceiver 2315 receives from the antenna 2310, an incoming RF signal transmitted by a gNB of a 5G network 400 (FIG. 4). The RF transceiver down-converts the incoming RF signal to generate an intermediate frequency (IF) or baseband signal. The IF or baseband signal is sent to the RX processing circuitry 2330, which generates a processed baseband signal by filtering, decoding, and/or digitizing the baseband or IF signal. The RX processing circuitry transmits the processed baseband signal to the speaker 2335 (such as for voice data) or to the processor 2340 for further processing (such as for web browsing data).

The TX processing circuitry 2320 receives analog or digital voice data from the microphone 2325 or other outgoing baseband data (such as web data, e-mail, or interactive video game data) from the processor 2340. The TX processing circuitry 2320 encodes, multiplexes, and/or digitizes the outgoing baseband data to generate a processed baseband or IF signal. The RF transceiver 2315 receives the outgoing processed baseband or IF signal from the TX processing circuitry and up-converts the baseband or IF signal to an RF signal that is transmitted via the antenna.

The processor 2340 can include one or more processors or other processing devices and execute the OS program 2365 stored in the memory 2360 to control the overall operation of the UE 200. For example, the processor may control the reception of forward channel signals and the transmission of reverse channel signals by the RF transceiver 2315, the RX processing circuitry 2330, and the TX processing circuitry 2320 in accordance with well-known principles. In some embodiments, the processor 2340 includes at least one microprocessor or microcontroller.

The processor 2340 may be configured for executing other processes and programs resident in the memory 2360, such as operations for CSI measurement and reporting for systems described in embodiments of the present disclosure. The processor can move data into or out of the memory as required by an executing process. In some embodiments, the processor may be configured to execute the applications 410 based on the OS program 2365 or in response to signals received from gNBs or an operator. The processor is also coupled to the I/O interface 2345, which provides the UE 200 with the ability to connect to other computing devices such as laptop computers and handheld computers. The I/O interface may thus function as a communication path between such accessories and the processor.

The processor 2340 is also coupled to the input device 2350 (e.g., keypad, touchscreen, buttons etc.) and the display 2355. A user of the UE 200 can typically employ the input device to enter data into the UE. For example, the display can be a liquid crystal display or other display capable of rendering text and/or graphics, video, etc., from web sites, applications and/or service providers.

The memory 2360 is coupled to the processor 2340. Part of the memory may include a random access memory (RAM), and another part of the memory may include a Flash memory or other read-only memory (ROM).

As described in more detail below, the UE 200 can perform signaling and calculation for channel state information (CSI) reporting. Although FIG. 23 shows one illustrative example of UE 200, it may be appreciated that various changes may be made to the drawing. For example, various components may be combined, further subdivided, or omitted, and additional components may be added according to particular needs. As a particular example, the processor 2340 may be divided into multiple processors, such as one or more central processing units (CPUs) and one or more graphics processing units (GPUs). Also, while FIG.

23 depicts the UE 200 as configured as a mobile device, such as a smartphone, UEs may be configured to operate as other types of portable or stationary devices.

Figure 24:
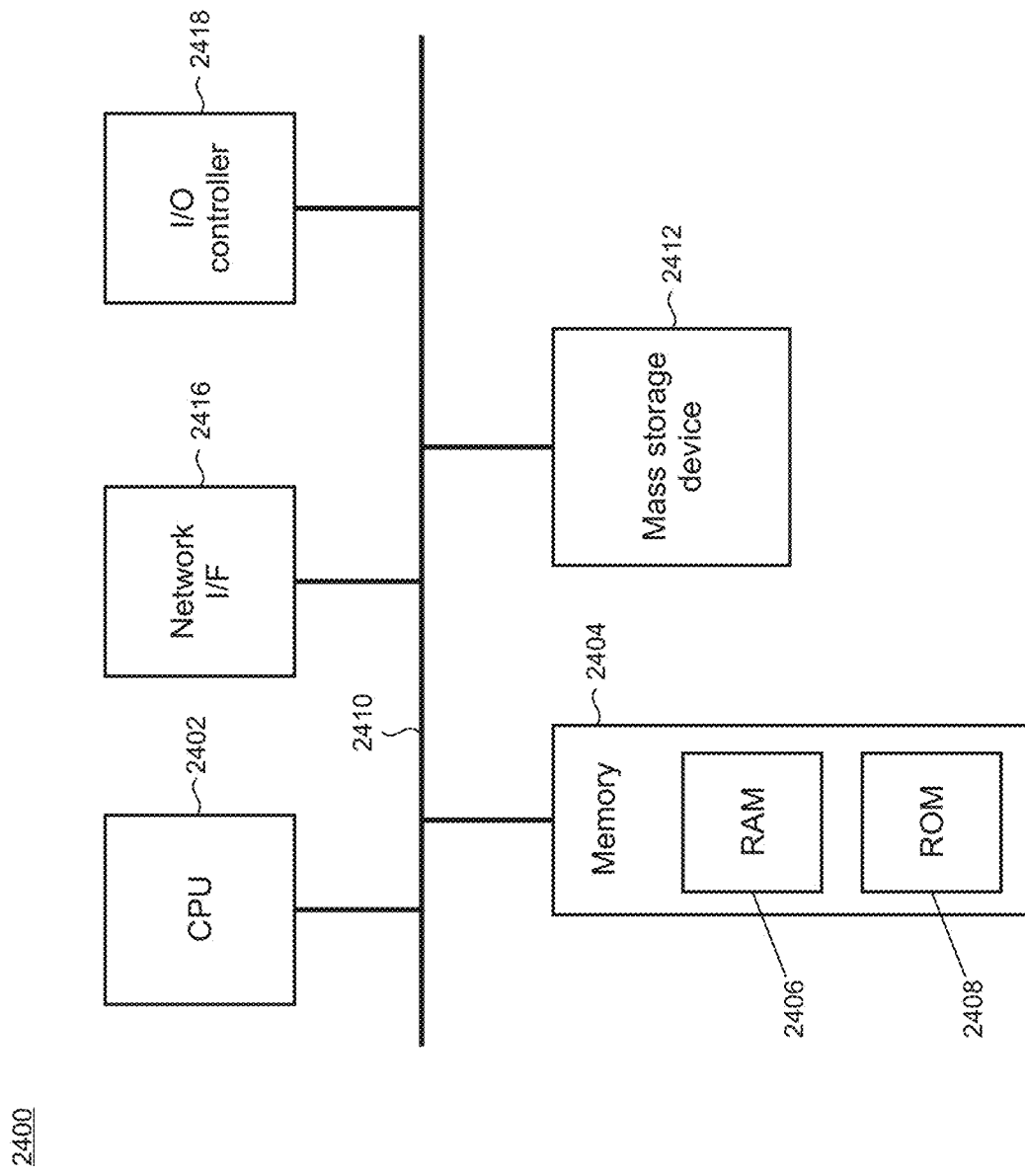
FIG. 24 is a block diagram of an illustrative server or computing device that may be used at least in part to implement the present trusted 5G network slices.

FIG. 24 shows an illustrative architecture 2400 for a computing device, such as a server, capable of executing the various components described herein for trusted 5G network slices. The architecture 2400 illustrated in FIG. 24 includes one or more processors 2402 (e.g., central processing unit, dedicated AI chip, graphics processing unit, etc.), a system memory 2404, including RAM (random access memory) 2406 and ROM (read only memory) 2408, and a system bus 2410 that operatively and functionally couples the components in the architecture 2400. A basic input/output system containing the basic routines that help to transfer information between elements within the architecture 2400, such as during startup, is typically stored in the ROM 2408. The architecture 2400 further includes a mass storage device 2412 for storing software code or other computer-executed code that is utilized to implement applications, the file system, and the operating system. The mass storage device 2412 is connected to the processor 2402 through a mass storage controller (not shown) connected to the bus 2410. The mass storage device 2412 and its associated computer-readable storage media provide non-volatile storage for the architecture 2400. Although the description of computer-readable storage media contained herein refers to a mass storage device, such as a hard disk or CD-ROM drive, it may be appreciated by those skilled in the art that computer-readable storage media can be any available storage media that can be accessed by the architecture 2400.

By way of example, and not limitation, computer-readable storage media may include volatile and non-volatile, removable and non-removable media implemented in any method or technology for storage of information such as computer-readable instructions, data structures, program modules, or other data. For example, computer-readable media includes, but is not limited to, RAM, ROM, EPROM (erasable programmable read only memory), EEPROM (electrically erasable programmable read only memory), Flash memory or other solid state memory technology, CD-ROM, DVDs, HD-DVD (High Definition DVD), Blu-ray, or other optical storage, magnetic cassettes, magnetic tape, magnetic disk storage or other magnetic storage devices, or any other medium which can be used to store the desired information and which can be accessed by the architecture 2400.

According to various embodiments, the architecture 2400 may operate in a networked environment using logical connections to remote computers through a network. The architecture 2400 may connect to the network through a network interface unit 2416 connected to the bus 2410. It may be appreciated that the network interface unit 2416 also may be utilized to connect to other types of networks and remote computer systems. The architecture 2400 also may include an input/output controller 2418 for receiving and processing input from a number of other devices, including a keyboard, mouse, touchpad, touchscreen, control devices such as buttons and switches or electronic stylus (not shown in FIG. 24). Similarly, the input/output controller 2418 may provide output to a display screen, user interface, a printer, or other type of output device (also not shown in FIG. 24).

It may be appreciated that the software components described herein may, when loaded into the processor 2402 and executed, transform the processor 2402 and the overall architecture 2400 from a general-purpose computing system into a special-purpose computing system customized to facilitate the functionality presented herein. The processor 2402 may be constructed from any number of transistors or other discrete circuit elements, which may individually or collectively assume any number of states. More specifically, the processor 2402 may operate as a finite-state machine, in response to executable instructions contained within the software modules disclosed herein. These computer-executable instructions may transform the processor 2402 by specifying how the processor 2402 transitions between states, thereby transforming the transistors or other discrete hardware elements constituting the processor 2402.

Encoding the software modules presented herein also may transform the physical structure of the computer-readable storage media presented herein. The specific transformation of physical structure may depend on various factors, in different implementations of this description. Examples of such factors may include, but are not limited to, the technology used to implement the computer-readable storage media, whether the computer-readable storage media is characterized as primary or secondary storage, and the like. For example, if the computer-readable storage media is implemented as semiconductor-based memory, the software disclosed herein may be encoded on the computer-readable storage media by transforming the physical state of the semiconductor memory. For example, the software may transform the state of transistors, capacitors, or other discrete circuit elements constituting the semiconductor memory. The software also may transform the physical state of such components in order to store data thereupon.

As another example, the computer-readable storage media disclosed herein may be implemented using magnetic or optical technology. In such implementations, the software presented herein may transform the physical state of magnetic or optical media, when the software is encoded therein. These transformations may include altering the magnetic characteristics of particular locations within given magnetic media. These transformations also may include altering the physical features or characteristics of particular locations within given optical media to change the optical characteristics of those locations. Other transformations of physical media are possible without departing from the scope and spirit of the present description, with the foregoing examples provided only to facilitate this discussion.

In light of the above, it may be appreciated that many types of physical transformations take place in the architecture 2400 in order to store and execute the software components presented herein. It also may be appreciated that the architecture 2400 may include other types of computing devices, including wearable devices, handheld computers, embedded computer systems, smartphones, PDAs, and other types of computing devices known to those skilled in the art. It is also contemplated that the architecture 2400 may not include all of the components shown in FIG. 24, may include other components that are not explicitly shown in FIG. 24, or may utilize an architecture completely different from that shown in FIG. 24.

Figure 25:
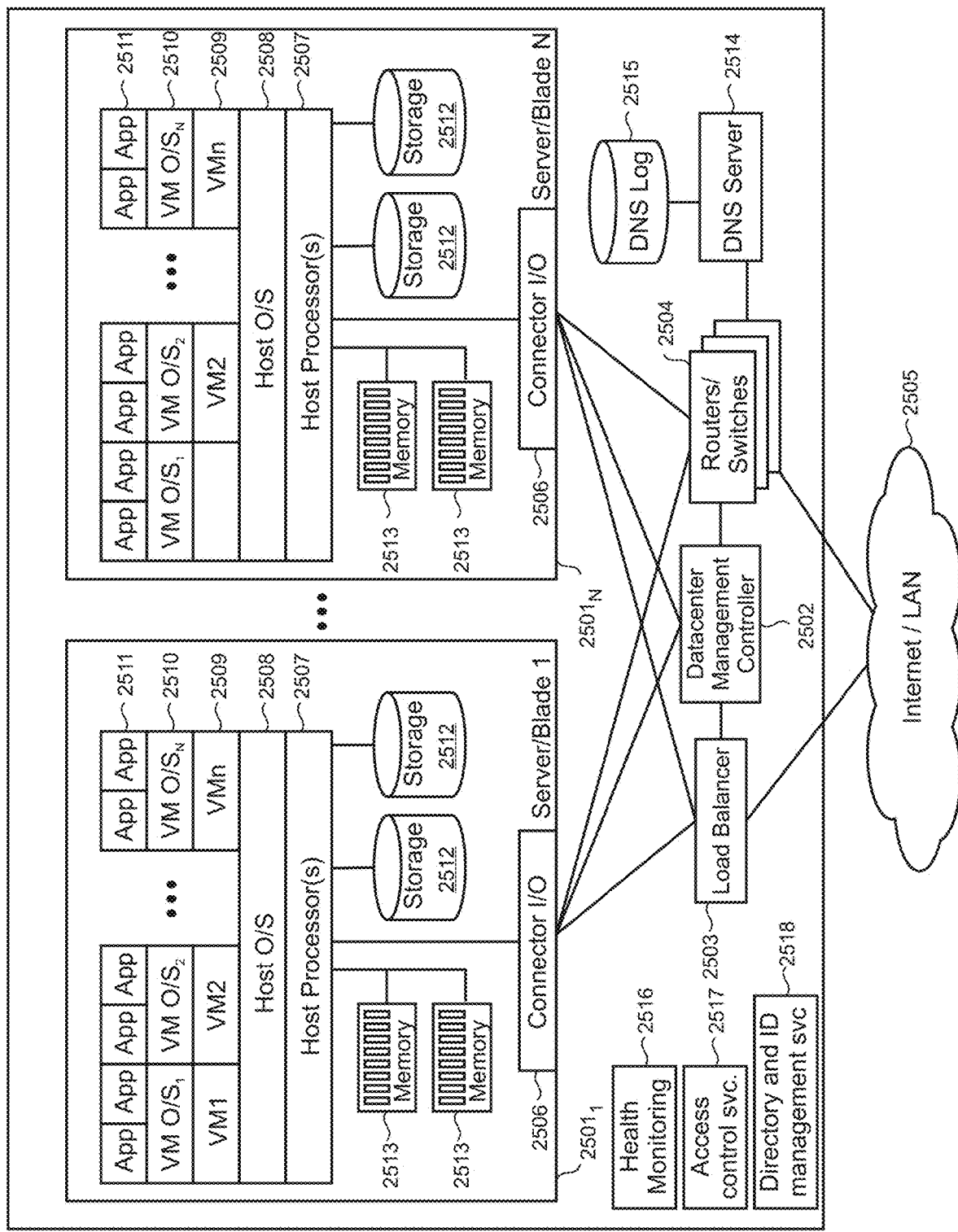
FIG. 25 is a block diagram of an illustrative datacenter that may be used at least in part to implement the present trusted 5G network slices.

FIG. 25 is a high-level block diagram of an illustrative datacenter 2500 that provides cloud computing services or distributed computing services that may be used to implement the present trusted 5G network slices. Datacenter 2500 may incorporate one or more of the features disclosed in the DCs shown in the drawings and described in the accompanying text. A plurality of servers 2501 are managed by datacenter management controller 2502. Load balancer 2503 distributes requests and computing workloads over servers 2501 to avoid a situation wherein a single server may become overwhelmed. Load balancer 2503 maximizes available capacity and performance of the resources in datacenter 2500. Routers/switches 2504 support data traffic between servers 2501 and between datacenter 2500 and external resources and users (not shown) via an external network 2505, which may be, for example, a local area network (LAN) or the Internet.

Servers 2501 may be standalone computing devices, and/or they may be configured as individual blades in a rack of one or more server devices. Servers 2501 have an input/output (I/O) connector 2506 that manages communication with other database entities. One or more host processors 2507 on each server 2501 run a host operating system (O/S) 2508 that supports multiple virtual machines (VM) 2509. Each VM 2509 may run its own O/S so that each VM O/S 2510 on a server is different, or the same, or a mix of both. The VM O/Ss 2510 may be, for example, different versions of the same O/S (e.g., different VMs running different current and legacy versions of the Windows® operating system). In addition, or alternatively, the VM O/Ss 2510 may be provided by different manufacturers (e.g., some VMs running the Windows® operating system, while other VMs are running the Linux® operating system). Each VM 2509 may also run one or more applications (App) 2511. Each server 2501 also includes storage 2512 (e.g., hard disk drives (HDD)) and memory 2513 (e.g., RAM) that can be accessed and used by the host processors 2507 and VMs 2509 for storing software code, data, etc. In one embodiment, a VM 2509 may employ the data plane APIs as disclosed herein.

Datacenter 2500 provides pooled resources on which customers or tenants can dynamically provision and scale applications as needed without having to add servers or additional networking. This allows tenants to obtain the computing resources they need without having to procure, provision, and manage infrastructure on a per-application, ad-hoc basis. A cloud computing datacenter 2500 allows tenants to scale up or scale down resources dynamically to meet the current needs of their business. Additionally, a datacenter operator can provide usage-based services to tenants so that they pay for only the resources they use, when they need to use them. For example, a tenant may initially use one VM 2509 on server 2501$_1$ to run their applications 2511. When demand for an application 2511 increases, the datacenter 2500 may activate additional VMs 2509 on the same server 2501$_1$ and/or on a new server 2501N as needed. These additional VMs 2509 can be deactivated if demand for the application later drops.

Datacenter 2500 may offer guaranteed availability, disaster recovery, and back-up services. For example, the datacenter may designate one VM 2509 on server 2501$_1$ as the primary location for the tenant's application and may activate a second VM 2509 on the same or a different server as a standby or back-up in case the first VM or server 2501$_1$ fails. The datacenter management controller 2502 automatically shifts incoming user requests from the primary VM to the back-up VM without requiring tenant intervention. Although datacenter 2500 is illustrated as a single location, it will be understood that servers 2501 may be distributed to multiple locations across the globe to provide additional redundancy and disaster recovery capabilities. Additionally, datacenter 2500 may be an on-premises, private system that provides services to a single enterprise user or may be a publicly accessible, distributed system that provides services to multiple, unrelated customers and tenants or may be a combination of both.

Domain Name System (DNS) server 2514 resolves domain and host names into IP addresses for all roles, applications, and services in datacenter 2500. DNS log 2515 maintains a record of which domain names have been resolved by role. It will be understood that DNS is used herein as an example and that other name resolution services and domain name logging services may be used to identify dependencies, for example, in other embodiments, IP or packet sniffing, code instrumentation, or code tracing.

Datacenter health monitoring 2516 monitors the health of the physical systems, software, and environment in datacenter 2500. Health monitoring 2516 provides feedback to datacenter managers when problems are detected with servers, blades, processors, or applications in datacenter 2500 or when network bandwidth or communications issues arise.

Access control service 2517 determines whether users are allowed to access particular connections and services provided at the datacenter 2500. Directory and identity management service 2518 authenticates user credentials for tenants on datacenter 2500.

FIG. 26 is a simplified block diagram of an illustrative computer system 2600 such as a PC, client machine, or server with which the present trusted 5G network slices may be implemented. Computer system 2600 includes a processor 2605, a system memory 2611, and a system bus 2614 that couples various system components including the system memory 2611 to the processor 2605. The system bus 2614 may be any of several types of bus structures including a memory bus or memory controller, a peripheral bus, or a local bus using any of a variety of bus architectures. The system memory 2611 includes read only memory (ROM) 2617 and random access memory (RAM) 2621. A basic input/output system (BIOS) 2625, containing the basic routines that help to transfer information between elements within the computer system 2600, such as during startup, is stored in ROM 2617. The computer system 2600 may further include a hard disk drive 2628 for reading from and writing to an internally disposed hard disk (not shown), a magnetic disk drive 2630 for reading from or writing to a removable magnetic disk 2633 (e.g., a floppy disk), and an optical disk drive 2638 for reading from or writing to a removable optical disk 2643 such as a CD (compact disc), DVD (digital versatile disc), or other optical media. The hard disk drive 2628, magnetic disk drive 2630, and optical disk drive 2638 are connected to the system bus 2614 by a hard disk drive interface 2646, a magnetic disk drive interface 2649, and an optical drive interface 2652, respectively. The drives and their associated computer-readable storage media provide non-volatile storage of computer-readable instructions, data structures, program modules, and other data for the computer system 2600. Although this illustrative example includes a hard disk, a removable magnetic disk 2633, and a removable optical disk 2643, other types of computer-readable storage media which can store data that is accessible by a computer such as magnetic cassettes, Flash memory cards, digital video disks, data cartridges, random access memories (RAMs), read only memories (ROMs), and the like may also be used in some applications of the present trusted 5G network slices. In addition, as used herein, the term computer-readable storage media includes one or more instances of a media type (e.g., one or more magnetic disks, one or more CDs, etc.). For purposes of this specification and the claims, the phrase "computer-readable storage media" and variations thereof, are intended to cover non-transitory embodiments, and does not include waves, signals, and/or other transitory and/or intangible communication media.

A number of program modules may be stored on the hard disk, magnetic disk 2633, optical disk 2643, ROM 2617, or RAM 2621, including an operating system 2655, one or more application programs 2657, other program modules 2660, and program data 2663. A user may enter commands and information into the computer system 2600 through input devices such as a keyboard 2666 and pointing device 2668 such as a mouse. Other input devices (not shown) may include a microphone, joystick, game pad, satellite dish, scanner, trackball, touchpad, touchscreen, touch-sensitive device, voice-command module or device, user motion or user gesture capture device, or the like. These and other input devices are often connected to the processor 2605 through a serial port interface 2671 that is coupled to the system bus 2614, but may be connected by other interfaces, such as a parallel port, game port, or universal serial bus (USB). A monitor 2673 or other type of display device is also connected to the system bus 2614 via an interface, such as a video adapter 2675. In addition to the monitor 2673, personal computers typically include other peripheral output devices (not shown), such as speakers and printers. The illustrative example shown in FIG. 26 also includes a host adapter 2678, a Small Computer System Interface (SCSI) bus 2683, and an external storage device 2676 connected to the SCSI bus 2683.

The computer system 2600 is operable in a networked environment using logical connections to one or more remote computers, such as a remote computer 2688. The remote computer 2688 may be selected as another personal computer, a server, a router, a network PC, a peer device, or other common network node, and typically includes many or all of the elements described above relative to the computer system 2600, although only a single representative remote memory/storage device 2690 is shown in FIG. 26. The logical connections depicted in FIG. 26 include a local area network (LAN) 2693 and a wide area network (WAN) 2695. Such networking environments are often deployed, for example, in offices, enterprise-wide computer networks, intranets, and the Internet.

When used in a LAN networking environment, the computer system 2600 is connected to the local area network 2693 through a network interface or adapter 2696. When used in a WAN networking environment, the computer system 2600 typically includes a broadband modem 2698, network gateway, or other means for establishing communications over the wide area network 2695, such as the Internet. The broadband modem 2698, which may be internal or external, is connected to the system bus 2614 via a serial port interface 2671. In a networked environment, program modules related to the computer system 2600, or portions thereof, may be stored in the remote memory storage device 2690. It is noted that the network connections shown in FIG. 26 are illustrative and other means of establishing a communications link between the computers may be used depending on the specific requirements of an application of the present trusted 5G network slices.

Various exemplary embodiments of the present security for 5G network slicing are now presented by way of illustration and not as an exhaustive list of all embodiments. An example includes a computer-implemented method for implementing a trust model across physical infrastructure of a 5G (fifth generation) network having a plurality of slices, the method comprising: distributing a plurality of trusted execution environments (TEEs) in the physical infrastructure comprising nodes of a trusted slice among the plurality of slices; binding data from a data source to the physical infrastructure of the trusted slice to seal the data in the trusted slice in which sealed data is encrypted based on a policy describing a node configuration; and configuring TEEs in the trusted slice to decrypt and forward the sealed data for delivery to a destination of the 5G network, wherein each of the TEEs is configured to successfully decrypt the sealed data responsively to a configuration of the node conforming to the policy.

In another example, the data source comprises user equipment (UE) and further including admitting the UE to the trusted slice responsive to the UE being authenticated to provide the data to the trusted slice. In another example, the physical infrastructure comprises a radio access network (RAN). In another example, the trusted slice is implemented in the 5G network on an end-to-end basis. In another example, the computer-implemented method further includes providing seal and unseal cryptographic primitives to implement the data binding to the trusted slice. In another example, arguments for the seal cryptographic primitive include an encryption key, a policy, and the data from the data source. In another example, arguments for the unseal cryptographic primitive include a decryption key, encrypted data, and an encrypted policy. In another example, the computer-implemented method further includes using decrypted data to reseal data based on a decrypted policy and forwarding the resealed data. In another example, the policy describes metrics comprising one or more of availability, throughput, latency, bit/packet error rate, or energy.

A further example includes one or more hardware-based non-transitory computer-readable memory devices storing computer-executable instructions which, upon execution by one or more processors disposed in a computing device deployed in a 5G (fifth generation) network having an air interface between a radio unit (RU) and a plurality of user equipment (UE) and in which the 5G network comprises a plurality of slices, cause the computing device to: receive encrypted information at a node of a slice among the plurality, the information comprising data for transmission on the 5G network and a policy, in which the data is encrypted using slice properties described in the policy, and in which the node supports a trusted execution environment (TEE); use a decryption process at the TEE of the node of the slice to attempt to decrypt the received information, in which the decryption process is configured for success only if a configuration of the slice conforms with properties described in the policy; and responsively to a successful decryption process, re-encrypt the data using the slice properties described in the decrypted policy.

In another example, the encrypted information is received from another node of the slice and the data for transmission originates from user equipment (UE) accessing the slice. In another example, the TEE is implemented using a trusted enclave that is operable on the computing device. In another example, successful decryption by a TEE in a node establishes that the node is trusted. In another example, the computer-executable instructions when executed further cause the computing device to report the configuration of the slice to a remote device.

A further example includes a computing device, comprising: at least one processor; and at least one hardware-based non-transitory computer-readable storage device having computer-executable instructions stored thereon which, when executed by the least one processor, cause the computing device to operate at least one trusted enclave on the computing device; instantiate a slice controller in the at least one trusted enclave, in which the slice controller is configured to control data transmissions over a trusted slice of one or more portions of a 5G (fifth generation) network, and in which the data transmissions are bound to the trusted slice by encryption of the data using slice properties provided in a policy, and in which the trusted slice comprises trusted hardware configured to verify its trustworthiness; dynamically collect and digest information describing properties of the trusted slice; maintain a trust relationship with a remote device; and report the digested information to the remote device to provide assurances that a configuration of the trusted slice conforms with the policy.

In another example, the 5G network portions include a radio access network (RAN), a mobile core, and one or more cloud networks. In another example, the policy comprises a logical expression that uses conjunction and disjunction operations over a set of terms wherein each term tests a condition over each of the properties. In another example, the properties comprise service types associated with the trusted slice, the service types including 5G standardized service types. In another example, the properties comprise geographic area of operations for one or more nodes of the trusted slice or attributes associated with one or more of software, firmware, or hardware used in infrastructure of one or more nodes of a trusted slice. In another example, the computer-executable instructions further cause the computing device to engage in a remote attestation process with the remote device.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:

1. A computer-implemented method for implementing a trust model across physical infrastructure of a 5G (fifth generation) network having a plurality of slices, the method comprising:
   distributing a plurality of trusted execution environments (TEEs) in the physical infrastructure comprising nodes of a trusted slice among the plurality of slices;
   binding data from a data source to the physical infrastructure of the trusted slice to seal the data in the trusted slice in which sealed data is encrypted based on a policy describing a node configuration;
   configuring TEEs in the trusted slice to decrypt and forward the sealed data for delivery to a destination of the 5G network, wherein each of the TEEs is configured to successfully decrypt the sealed data responsively to a configuration of the node conforming to the policy; and
   providing seal and unseal cryptographic primitives to implement the data binding to the trusted slice.

2. The computer-implemented method of claim 1 in which the data source comprises user equipment (UE) and further including admitting the UE to the trusted slice responsive to the UE being authenticated to provide the data to the trusted slice.

3. The computer-implemented method of claim 1 in which the physical infrastructure comprises a radio access network (RAN).

4. The computer-implemented method of claim 1 in which the trusted slice is implemented in the 5G network on an end-to-end basis.

5. The computer-implemented method of claim 1 in which arguments for the seal cryptographic primitive include an encryption key, a policy, and the data from the data source.

6. The computer-implemented method of claim 5 in which arguments for the unseal cryptographic primitive include a decryption key, encrypted data, and an encrypted policy.

7. The computer-implemented method of claim 6 further including using decrypted data to reseal data based on a decrypted policy and forwarding the resealed data.

8. The computer-implemented method of claim 1 in which the policy describes metrics comprising one or more of availability, throughput, latency, bit/packet error rate, or energy.

9. One or more hardware-based non-transitory computer-readable memory devices storing computer-executable instructions which, upon execution by one or more processors disposed in a computing device deployed in a 5G (fifth generation) network having an air interface between a radio unit (RU) and a plurality of user equipment (UE) and in which the 5G network comprises a plurality of slices, cause the computing device to:
   receive encrypted information at a node of a slice among the plurality, the information comprising data for transmission on the 5G network and a policy, in which the data is encrypted using slice properties described in the policy, and in which the node supports a trusted execution environment (TEE), wherein the received encrypted information is bound to the slice using seal cryptographic primitives;
   use a decryption process at the TEE of the node of the slice to attempt to decrypt the received information, in which the decryption process is configured for success only if a configuration of the slice conforms with properties described in the policy, wherein the decryption process uses unseal cryptographic primitives; and
   responsively to a successful decryption process, re-encrypt the data using the slice properties described in a decrypted policy.

10. The one or more hardware-based non-transitory computer-readable memory devices of claim 9 in which the encrypted information is received from another node of the slice and in which the data for transmission originates from user equipment (UE) accessing the slice.

11. The one or more hardware-based non-transitory computer-readable memory devices of claim 9 in which the TEE is implemented using a trusted enclave that is operable on the computing device.

12. The one or more hardware-based non-transitory computer-readable memory devices of claim 9 in which successful decryption by a TEE in a node establishes that the node is trusted.

13. The one or more hardware-based non-transitory computer-readable memory devices of claim 9 in which the computer-executable instructions when executed further cause the computing device to report the configuration of the slice to a remote device.

14. A computing device, comprising:
   at least one processor; and
   at least one hardware-based non-transitory computer-readable storage device having computer-executable instructions stored thereon which, when executed by the least one processor, cause the computing device to
   operate at least one trusted enclave on the computing device;
   instantiate a slice controller in the at least one trusted enclave, in which the slice controller is configured to control data transmissions over a trusted slice of one or more portions of a 5G (fifth generation) network, and in which the data transmissions are bound to the trusted slice by encryption of the data using slice properties provided in a policy, and in which the trusted slice comprises trusted hardware configured to verify its trustworthiness;

dynamically collect and digest information describing properties of the trusted slice;
maintain a trust relationship with a remote device; and
report the digested information to the remote device to provide assurances that a configuration of the trusted slice conforms with the policy.

15. The computing device of claim 14 in which the 5G network portions include a radio access network (RAN), a mobile core, and one or more cloud networks.

16. The computing device of claim 14 in which the policy comprises a logical expression that uses conjunction and disjunction operations over a set of terms wherein each term tests a condition over each of the properties.

17. The computing device of claim 14 in which the properties comprise service types associated with the trusted slice, the service types including 5G standardized service types.

18. The computing device of claim 14 in which the properties comprise geographic area of operations for one or more nodes of the trusted slice or attributes associated with one or more of software, firmware, or hardware used in infrastructure of one or more nodes of a trusted slice.

19. The computing device of claim 14 in which the computer-executable instructions further cause the computing device to engage in a remote attestation process with the remote device.

\* \* \* \* \*